United States Patent
Wang et al.

(10) Patent No.: US 11,641,570 B2
(45) Date of Patent: May 2, 2023

(54) INFORMATION TRANSMISSION METHOD, DEVICE, SYSTEM AND STORAGE MEDIUM

(71) Applicant: ZTE CORPORATION, Guangdong (CN)

(72) Inventors: Mengzhen Wang, Shenzhen (CN); Lin Chen, Shenzhen (CN); Yuqin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 309 days.

(21) Appl. No.: 16/496,902

(22) PCT Filed: Mar. 19, 2018

(86) PCT No.: PCT/CN2018/079418
§ 371 (c)(1),
(2) Date: Sep. 23, 2019

(87) PCT Pub. No.: WO2018/171540
PCT Pub. Date: Sep. 27, 2018

(65) Prior Publication Data
US 2020/0092692 A1 Mar. 19, 2020

(30) Foreign Application Priority Data
Mar. 23, 2017 (CN) .......................... 201710178960.0

(51) Int. Cl.
*H04W 4/40* (2018.01)
*H04W 76/27* (2018.01)
(Continued)

(52) U.S. Cl.
CPC ............. *H04W 4/40* (2018.02); *H04L 1/0003* (2013.01); *H04L 1/1819* (2013.01);
(Continued)

(58) Field of Classification Search
None
See application file for complete search history.

(56) References Cited

U.S. PATENT DOCUMENTS

| 2011/0075620 A1* | 3/2011 | Jang | H04W 28/18 370/329 |
| 2011/0159799 A1* | 6/2011 | Chen | H04L 1/1867 455/3.01 |

(Continued)

FOREIGN PATENT DOCUMENTS

| CN | 103238289 A | 8/2013 |
| CN | 104486049 A | 4/2015 |

(Continued)

OTHER PUBLICATIONS

International Search Report of Application No. PCT/CN2018/079418—4 pages (dated Jun. 8, 2018).

(Continued)

*Primary Examiner* — Alpus Hsu
*Assistant Examiner* — Camquyen Thai
(74) *Attorney, Agent, or Firm* — Knobbe, Martens, Olson & Bear, LLP

(57) ABSTRACT

Disclosed are an information transmission method, device and system and a storage medium. The method is applied to a user equipment (UE) in an Internet-of-vehicle architecture. The method includes: acquiring, by the UE, sidelink retransmission configuration information; and performing, by the UE, a sidelink feedback or a sidelink retransmission according to the sidelink retransmission configuration information.

17 Claims, 7 Drawing Sheets

A UE acquires sidelink retransmission configuration information — S201

The UE performs a sidelink feedback or a sidelink retransmission according to the sidelink retransmission configuration information — S202

(51) Int. Cl.
  *H04L 1/00* (2006.01)
  *H04L 1/18* (2006.01)
  *H04L 5/00* (2006.01)
  *H04W 80/02* (2009.01)
  *H04W 92/18* (2009.01)
  *H04L 1/1812* (2023.01)

(52) U.S. Cl.
  CPC .......... *H04L 5/0055* (2013.01); *H04L 5/0082* (2013.01); *H04W 76/27* (2018.02); *H04W 80/02* (2013.01); *H04W 92/18* (2013.01)

(56) References Cited

U.S. PATENT DOCUMENTS

| | | | |
|---|---|---|---|
| 2012/0020213 A1* | 1/2012 | Horneman | H04W 28/0289 370/231 |
| 2012/0327760 A1* | 12/2012 | Du | H04L 1/1887 370/216 |
| 2013/0250843 A1 | 9/2013 | Zhou et al. | |
| 2014/0177449 A1* | 6/2014 | Novak | H04W 4/80 370/241 |
| 2016/0157181 A1* | 6/2016 | Leicht | H04W 52/0251 455/574 |
| 2016/0227463 A1* | 8/2016 | Baligh | H04W 40/16 |
| 2016/0308764 A1* | 10/2016 | Le | H04L 69/163 |
| 2016/0352467 A1* | 12/2016 | Rawat | H04L 1/1848 |
| 2017/0012745 A1* | 1/2017 | Yang | H04L 1/1851 |
| 2017/0048828 A1 | 2/2017 | Um et al. | |
| 2017/0048922 A1* | 2/2017 | Lee | H04W 76/11 |
| 2017/0195911 A1 | 7/2017 | Lee et al. | |
| 2018/0234881 A1* | 8/2018 | Hosseini | H04L 1/1864 |

FOREIGN PATENT DOCUMENTS

| | | |
|---|---|---|
| CN | 105099627 A | 11/2015 |
| CN | 105101430 A | 11/2015 |
| CN | 105553612 A | 5/2016 |
| CN | 105813204 A | 7/2016 |
| CN | 105991247 A | 10/2016 |
| CN | 105992279 A | 10/2016 |
| CN | 106162929 A | 11/2016 |
| WO | 2016035988 A1 | 3/2016 |
| WO | 2017026970 A1 | 2/2017 |

OTHER PUBLICATIONS

Office Action received in Chinese Patent Application No. 2017101789600, dated Jul. 30, 2021 in 18 pages.
International Search Report received in Application No. 2017101789600., dated Jul. 26, 2021 in 6 pages.

* cited by examiner

INFORMATION TRANSMISSION METHOD, DEVICE, SYSTEM AND STORAGE MEDIUM

CROSS-REFERENCES TO RELATED APPLICATIONS

This is a National stage application, filed under 37 U.S.C. 371, of International Patent Application NO. PCT/CN2018/079418, filed on Mar. 19, 2018, which claims priority to a Chinese patent application No. 201710178960.0 filed on Mar. 23, 2017, disclosures of which are incorporated herein by reference in their entireties.

TECHNICAL FIELD

The present disclosure relates to wireless communication technologies and, in particular, to an information transmission method, device and system and a storage medium.

BACKGROUND

Vehicle-to-everything communications (V2X) is a key technology for future intelligent transportation systems. The V2X provides vehicle information by means of sensors, vehicle-mounted terminals and electronic tags mounted on vehicles, and implements vehicle-to-vehicle communications (V2V), vehicle-to-pedestrian communications (V2P), vehicle-to-infrastructure communications (V2I) and vehicle-to-network communications (V2N) through various communication technologies, acquiring a series of traffic information such as real-time road conditions, road information, pedestrian information and the like, thereby improving the driving safety, reducing the congestion and improving the traffic efficiency. Currently, the 3rd Generation Partnership Project (3GPP) has proposed the V2X based on Long Term Evolution (LTE). In the V2X based on the LTE, the V2X information is mainly transmitted by means of broadcast and multicast, for example, a broadcast mechanism based on a multimedia broadcast multicast service single frequency network (MBSFN) and a single cell-point to multi-point (SC-PTM). In addition, the mechanism of direct discovery or communication between user equipments (UEs) in vehicles may be achieved by broadcast transmission through a PC5 interface.

The protocol of the 3GPP R14 (Release 14) version specifies that: the main performance requirements of the V2X based on the LTE are that the delay time is 20 ms at least and the reliability reaches over 95%; while the enhanced V2X (eV2X) communication, in contrast to the above-mentioned LTE-based V2X, has higher performance requirements to support vehicle networking applications such as platooning, remote driving, sensor applications and the like. The performance requirements of the eV2X include that the reliability needs to reach 99% to 99.999%, and the delay requirement needs to be 3 to 10 ms. However, the V2X communication technology performed through the PC5 interface cannot meet such high reliability requirement of the eV2X scenario at present.

SUMMARY

In view of this, embodiments of the present disclosure provide an information transmission method, device and system, and a storage medium, which may meet high reliability requirements of vehicle-to-everything communications (V2X), so as to improve the reliability and the safety of the V2X service.

Technical solutions of the present disclosure are implemented as follows.

In a first aspect, an embodiment of the present disclosure provides an information transmission method. The method is applied to a user equipment (UE) in a V2X architecture, and includes following steps.

The UE acquires sidelink retransmission configuration information.

The UE performs a sidelink feedback or a sidelink retransmission according to the sidelink retransmission configuration information.

In the above solution, the sidelink retransmission configuration information includes at least one of: a sidelink retransmission manner, sidelink transmission reliability information, media access control (MAC) retransmission configuration information, radio link control (RLC) retransmission configuration information, a sidelink feedback resource or a transmission resource or a retransmission resource, or numerology mapped to a sidelink logic channel or a bearer, or frame length information of a transmission time interval (TTI) mapped to the sidelink logical channel or the bearer.

The above solution, the sidelink retransmission manner includes any one of: hybrid automatic repeat request (HARQ) continuous retransmission, automatic repeat request (ARQ) continuous retransmission, HARQ feedback and HARQ retransmission, a combination of HARQ retransmission, ARQ feedback and ARQ retransmission, or a combination of the HARQ feedback, the HARQ retransmission, the ARQ feedback and the ARQ retransmission.

In the above solution, the MAC retransmission configuration information includes at least one of: the number of HARQ continuous retransmissions, the maximum number of HARQ retransmissions, an HARQ process number, sidelink transmission power, a modulation and coding scheme (MCS) of a sidelink, or a redundancy version.

In the above solution, the RLC retransmission configuration information includes: RLC retransmission configuration information related to a transmission operation and/or RLC retransmission configuration information related to a receiving operation. The RLC retransmission configuration information related to the transmission operation includes the number of ARQ continuous retransmissions or any combination of: the maximum number of ARQ retransmissions, an RLC acknowledged mode (AM) sequence number length, a polling retransmission timer, a polling protocol data unit and the number of poll bytes. The RLC retransmission configuration information related to the receiving operation includes the RLC AM sequence number length, a reordering timer and a status prohibition timer.

In the above solution, if the sidelink retransmission manner does not include HARQ feedback, the reordering timer is set to be zero, or the reordering timer is not configured.

If the sidelink retransmission manner includes HARQ feedback, the reordering timer is set according to the maximum number of HARQ retransmissions and time required by HARQ retransmission, or the reordering timer is set according to at least one of: the numerology mapped to the sidelink logical channel or the bearer, or the frame length information of the TTI mapped to the sidelink logical channel or the bearer.

In the above solution, the sidelink feedback resource or transmission resource or retransmission resource includes at least one of: a resource indication for sending sidelink HARQ feedback, a resource or a resource pool for sidelink communication transmission, a semi-static resource for the sidelink communication transmission, a resource/a resource pool for sidelink communication retransmission, a pairing resource for the sidelink communication transmission/retransmission and for the sidelink HARQ feedback, or a pairing relationship of the resource for the sidelink communication transmission/retransmission and the resource for the sidelink HARQ feedback. The resource indication for sending the sidelink HARQ feedback includes at least one of: a time relationship of sidelink transmission and HARQ feedback, a frame offset, a subframe offset, a resource pattern or a resource bitmap, or a resource index.

The UE receives the sidelink retransmission configuration information sent by a base station.

The UE acquires the sidelink retransmission configuration information through pre-configuration information.

The UE receives the sidelink retransmission configuration information sent by a peer UE.

In the above solution, the step in which the UE receives the sidelink retransmission configuration information sent by a base station includes one of following steps.

The UE receives the sidelink retransmission configuration information sent by the base station from a system broadcast message, or the UE receives the sidelink retransmission configuration information from radio resource control (RRC) dedicated signaling.

In the above solution, the step in which the UE acquires the sidelink retransmission configuration information through pre-configuration information includes a following step.

The UE acquires the pre-configuration information comprising the sidelink retransmission configuration information from a proximity based services function (ProSe Function) or from a V2X control function.

In the above solution, the step in which the UE receives the sidelink retransmission configuration information sent by a peer UE includes at least one of following steps.

The UE receives PC5 signaling sent by the peer UE and carrying the sidelink retransmission configuration information, or the UE receives sidelink control information (SCI) sent by the peer UE and carrying the sidelink feedback resource.

In the above solution, before the UE acquires the sidelink retransmission configuration information, the method includes a following step.

The UE sends sidelink retransmission indication information to a base station. The sidelink retransmission indication information includes at least one of: a service/bearer reliability requirement/level, a service/bearer packet loss rate requirement, a service type, a priority, a delay requirement, a sidelink retransmission requirement indication, UE-preferred sidelink retransmission configuration, sidelink retransmission configuration supportable by the UE, a sidelink resource request, or a sidelink buffer status report.

In the above solution, before or after the UE receives the sidelink retransmission configuration information sent by a base station, the method further includes a following step.

The UE receives sidelink transmission power and/or a sidelink MCS configured by the base station. Transmit power and/or an MCS of the UE are configured by the base station by monitoring a transmission and a feedback on a sidelink and according to a frequency of negative acknowledgements (NACKs) fed back from the received UE.

In the above solution, the step in which the UE performs sidelink feedback or sidelink retransmission according to the sidelink retransmission configuration information includes at least one of following steps.

If the UE is configured as the sidelink HARQ feedback, the UE perform the sidelink HARQ feedback by using the received resource for sending the sidelink HARQ feedback, or if the UE is configured as the sidelink ARQ feedback, the UE performs the sidelink ARQ feedback by using received RLC retransmission configuration information.

In the above solution, the step in which the UE performs sidelink retransmission according to the sidelink retransmission configuration information includes at least one of following steps.

If the UE selects or is configured as the HARQ continuous retransmission, the UE performs the sidelink retransmission according to the number of HARQ continuous retransmissions; or if the UE selects or is configured as the ARQ continuous retransmission, the UE performs the sidelink retransmission according to the number of ARQ continuous retransmissions; or if the UE selects or is configured as the HARQ feedback and the HARQ retransmission, the UE performs the sidelink retransmission according to one or more of: the maximum number of HARQ retransmissions, sidelink transmission power, an MCS of the sidelink and a redundancy version; or if the UE selects or is configured as the combination of the HARQ retransmission, ARQ feedback and ARQ retransmission, the UE performs the sidelink retransmission according to the number of HARQ continuous retransmissions and the RLC retransmission configuration information; or if the UE selects or is configured as the HARQ feedback, the combination of the HARQ retransmission, ARQ feedback and ARQ retransmission, the UE performs the sidelink retransmission according to one or more of: the maximum number of HARQ retransmissions, the sidelink transmission power, the MCS of the sidelink, the redundancy version and the RLC retransmission configuration information.

The UE performs the sidelink retransmission by using pre-configured sidelink retransmission configuration information.

In the above solution, before or after the UE performs sidelink retransmission according to the sidelink retransmission configuration information, the method further includes a following step.

The UE adjusts sidelink transmission power and/or an MCS of a sidelink.

In the above solution, before the UE performs sidelink retransmission according to the sidelink retransmission configuration information, the method further includes a following step.

The UE receives sidelink HARQ feedback or sidelink ARQ feedback sent by a peer UE.

In the above solution, before or after the UE performs sidelink retransmission according to the sidelink retransmission configuration information, the method further includes a following step. The UE receives a data packet lost on the sidelink sent by the base station.

In a second aspect, an embodiment of the present disclosure provides an information transmission method. The method is applied to a base station in a V2X architecture, and includes a following step.

The base station sends sidelink retransmission configuration information to a UE.

In the above solution, before the base station sends sidelink retransmission configuration information to a UE, the method further includes a following step.

The base station receives sidelink retransmission indication information sent by the UE.

The sidelink retransmission indication information includes at least one of: a service/bearer reliability requirement/level, a service/bearer packet loss rate requirement, a service type, a priority, a delay requirement, a sidelink retransmission requirement indication, UE-preferred sidelink retransmission configuration, sidelink retransmission configuration supportable by the UE, a sidelink resource request, or a sidelink buffer status report.

In the above solution, after the base station sends sidelink retransmission configuration information to a UE, the method includes following steps.

The base station monitors a transmission and a feedback on the sidelink, the base station configures or modifies sidelink transmission power and/or an MCS of the sidelink for a UE which is configured to send information, or the base station sends a data packet lost on the sidelink to a UE which is configured to receive information.

In the above solution, the step in which the base station sends a data packet lost on the sidelink to a UE which is configured to receive information includes following steps.

The base station monitors a transmission and a feedback on the sidelink; when NACK feedback is monitored, the base station sends the lost data packet to the UE which is configured to receive information through a sidelink resource in a downlink or uplink subframe of a Uu interface.

In a third aspect, an embodiment of the present disclosure provides a UE. The UE includes an acquisition module and a performing module.

The acquisition module is configured to acquire sidelink retransmission configuration information.

The performing module is configured to perform a sidelink feedback or a sidelink retransmission according to the sidelink retransmission configuration information.

In a fourth aspect, an embodiment of the present disclosure provides a base station. The base station includes a second sending module. The second sending module is configured to send sidelink retransmission configuration information to a UE.

In a fifth aspect, an embodiment of the present disclosure further provides a non-transitory computer-readable storage medium storing computer program instructions. The computer program instructions are configured to be executed by an electric device and include instructions for implementing following operations:
acquiring Sidelink retransmission configuration information, and performing a sidelink feedback or a sidelink retransmission according to the sidelink retransmission configuration information.

In a sixth aspect, an embodiment of the present disclosure provides a UE. The UE includes a first communication interface, a first memory, a first processor and a first bus.

The first bus is configured to connect the first communication interface, the first processor and the first memory for communication among the first communication interface, the first processor and the first memory.

The first communication interface is configured to perform data transmission with an external network element.

The first memory is configured to store instructions and data.

The first processor is configured to, when executing the instructions, implement: acquiring sidelink retransmission configuration information, and performing sidelink feedback or sidelink retransmission according to the sidelink retransmission configuration information.

In a seventh aspect, an embodiment of the present disclosure further provides a non-transitory computer-readable storage medium storing computer program instructions. The computer program instructions are configured to be executed by an electric device and include instructions for implementing a following operation: sending sidelink retransmission configuration information to a UE.

In an eighth aspect, an embodiment of the present disclosure provides a base station. The base station includes a second communication interface, a second memory, a second processor and a second bus.

The second bus is configured to connect the second communication interface, the second processor and the second memory for communication among the second communication interface, the second processor and the second memory.

The second communication interface is configured to perform data transmission with an external network element.

The second memory is configured to store instructions and data.

The second processor is configured to, when executing the instructions, implement: sending sidelink retransmission configuration information to a UE.

In a ninth aspect, an embodiment of the present disclosure provides an information transmission system. The information transmission system includes a UE and a base station in a V2X architecture.

The UE is configured to acquire sidelink retransmission configuration information, and perform a sidelink feedback or a sidelink retransmission according to the sidelink retransmission configuration information.

The base station is configured to send the sidelink retransmission configuration information to the UE.

On the premise of applications or services with different scenarios and different reliability requirements, the information transmission method, device and system, and the storage medium provided by the embodiments of the present disclosure use appropriate sidelink retransmission configuration information to ensure the reliability, thereby meeting high reliability requirements of the V2X communication.

DETAILED DESCRIPTION

The present disclosure will be described below in detail with reference to the drawings and embodiments. It is to be understood that the embodiments described herein are intended to explain and not to limit the present disclosure.

Figure 1:
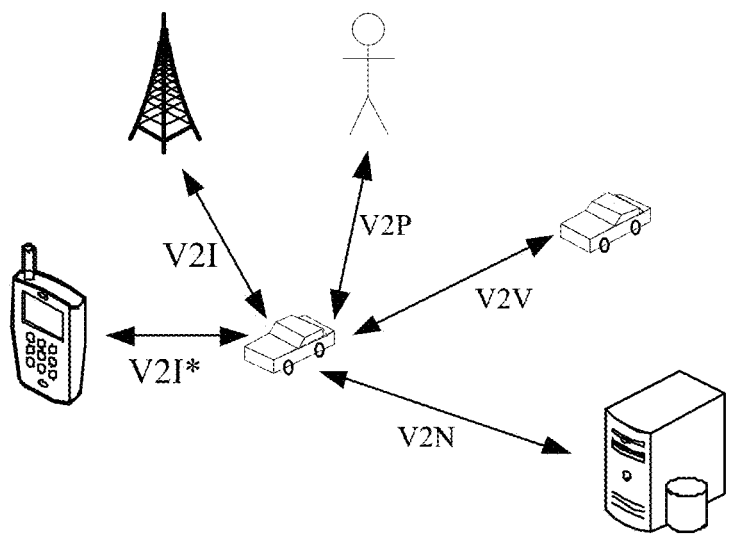
FIG. 1 is a schematic diagram of a vehicle-to-everything architecture according to an embodiment of the present disclosure.

For the vehicle-to-everything communications (V2X) service, the V2X service may be generally include the vehicle-to-vehicle communications (V2V) service, the vehicle-to-infrastructure communications (V2I) service the vehicle-to-network communications (V2N) service and the vehicle-to-pedestrian communications (V2P) service. A V2X architecture is shown in FIG. 1. The V2P service refers to a service in which a vehicle user equipment (UE) communicates with a pedestrian-held UE through a V2P application.

The V2N service refers to a service in which UEs communicate with each other through a Long Term Evolution (LTE) network entity by using a V2N application.

The V2I service refers to a service in which a UE interacts with a road side unit (RSU) through a V2I application. It is to be noted that the RSU is an entity supporting the V2I service and may be implemented through a base station (e.g., an evolved base station eNB) or through a stationary UE. If the RSU is implemented through the base station, which is referred to as an eNB type RSU and is shown as I identified in FIG. 1, the V2I service at this point is shown as an arrow identified as V2I in FIG. 1. If the RSU is implemented through the UE, which is referred to as a UE type RSU and is shown as I* identified in FIG. 1, the V2I service at this time is shown as an arrow identified as V2I* in FIG. 1.

The V2V service refers to a service in which vehicle UEs communicate with each other through a V2V application. The V2V service includes a direct communication of V2V application information between vehicle UEs, or communication of V2V application information between vehicle UEs through infrastructure (e.g., an RSU, an application server, etc.) supporting the V2X service in the case where the V2V direct communication range is limited.

For transmission reliability, the LTE includes a level-two retransmission processing mechanism, i.e. a hybrid automatic repeat request (HARQ) mechanism of a media access control (MAC) layer and an automatic repeat request (ARQ) mechanism of a radio link control (RLC) layer. Generally, the ARQ mechanism is only specific to an acknowledged mode (AM).

For the above level-two retransmission processing mechanism, it is to be noted that the retransmission of lost or erroneous data is mainly processed by the HARQ mechanism of the MAC layer and is supplemented by a retransmission function of the RLC. The HARQ mechanism of the MAC layer may provide fast retransmission, and the ARQ mechanism of the RLC layer may provide reliable data transmission. Therefore, the combination of these two mechanisms may meet requirements of short round trip time, moderate feedback overhead and reliable transmission.

For sidelink/sidelink communication, in a protocol on device-to-device (D2D) in the R12 or R13 version of 3GPP, sidelink transmission is performed at the MAC layer, and the HARQ mechanism supports four times of retransmission but does not support feedback. In a protocol on the V2V in the R14 version of 3GPP, each transport block is transmitted once or twice, that is, each transport block may only be retransmitted once at most. The number of transmissions may be configured by an eNB or be determined by a UE itself. Therefore, current sidelink transmission cannot meet the high reliability requirement of the eV2X.

The following embodiments are provided to improve the reliability and security of the V2X communication service by using the V2X architecture shown in FIG. 1 as an example, and it is to be understood that the network architecture shown in FIG. 1 is only used for illustrating the embodiments and is not limited to the embodiments.

Figure 2:
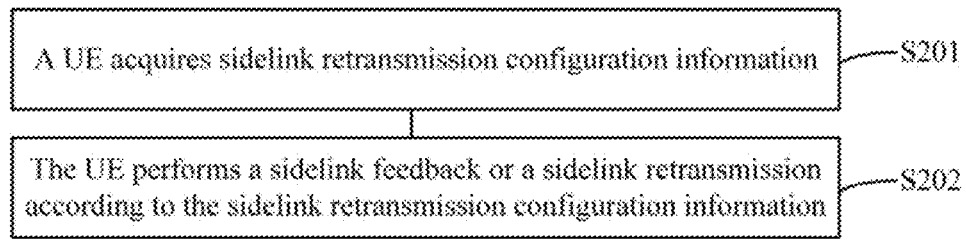
FIG. 2 is a flowchart of an information transmission method according to an embodiment of the present disclosure.

FIG. 2 shows an information transmission method provided by an embodiment of the present disclosure. Referring to FIG. 2, the method may be applied to a UE in the V2X and include the steps S201 and S202.

In S201, the UE acquires sidelink retransmission configuration information.

In S201, the UE performs sidelink feedback or sidelink retransmission according to the sidelink retransmission configuration information.

It is to be noted that the UE involved in the technical solution shown in FIG. 2, when it is divided according to roles participating in communication, may include, but is not limited to, a UE for sending information, a UE for receiving information and a peer UE related to the local; and when it is divided according to roles in the V2X architecture, may include, but is not limited to, a D2D UE, a vehicle UE, a pedestrian UE and a UE type RSU.

Exemplarily, in S201, the sidelink retransmission configuration information may include at least one of: a sidelink retransmission manner, sidelink transmission reliability information, a sidelink logical channel or bearer identity, MAC retransmission configuration information, RLC retransmission configuration information, a sidelink feedback resource or transmission resource or retransmission resource, or frame length information of numerology mapped to a sidelink logic channel or a bearer or frame length information of a transmission time interval (TTI) mapped to the sidelink logical channel or the bearer.

In an embodiment, for information included in the sidelink retransmission configuration information mentioned in the above example, it is to be noted that the sidelink retransmission manner may be configured to configure a manner for the UE to perform feedback or retransmission, so that the UE performs feedback or retransmission according to the configured manner. In an embodiment, the sidelink retransmission manner may include any one of: HARQ continuous retransmission, ARQ continuous retransmission, HARQ feedback and HARQ retransmission, a combination of HARQ retransmission, ARQ feedback and ARQ retransmission, or a combination of HARQ feedback, HARQ retransmission, ARQ feedback and ARQ retransmission.

In an embodiment, the sidelink transmission reliability information mentioned in the above example may be configured to indicate a sidelink transmission reliability level that the sidelink retransmission manner and/or the MAC retransmission configuration information and/or the RLC retransmission configuration information may be provide. For example, the sidelink transmission reliability information may include at least one of: a quantized sidelink transmission reliability level (e.g., a high reliability level, a medium reliability level, a low reliability level, etc.), or a sidelink transmission packet loss rate.

In an embodiment, the sidelink logical channel or bearer identity mentioned in the above example may include sidelink retransmission configuration information indicating a sidelink logic channel or mapped to a bearer. It will be understood that sidelink logical channels or bearers of different bearer levels respectively have corresponding sidelink retransmission configuration information.

In an embodiment, the MAC retransmission configuration information mentioned in the above example may include at least one of: the number of HARQ continuous retransmissions, the maximum number of HARQ retransmissions, an HARQ process number, sidelink transmission power, a modulation and coding scheme (MCS) of a sidelink, or a redundancy version.

In an embodiment, the RLC retransmission configuration information mentioned in the above example may include RLC retransmission configuration information related to a transmission operation and/or RLC retransmission configuration information related to a receiving operation. The RLC retransmission configuration information related to the transmission operation includes the number of ARQ continuous retransmissions or any combination of: the maximum number of ARQ retransmissions, an RLC acknowledged mode (AM) sequence number length, a polling retransmission timer, a polling protocol data unit and the number of poll bytes. The RLC retransmission configuration information related to the receiving operation includes the RLC AM sequence number length, a reordering timer, t-reordering, and a status prohibition timer, t-statusprohibit.

For the reordering timer, t-reordering, it is to be noted that if the sidelink retransmission manner does not include HARQ feedback, that is, if the retransmission manner is HARQ retransmission and the combination of ARQ feedback and ARQ retransmission, the t-reordering may be set to be zero, or the reordering timer is not configured. For example, when an RLC layer of the UE for receiving information receives a non-sequentially received data packet, that is, if the UE for receiving information finds a data packet lost, the ARQ is immediately triggered to feed back negative acknowledgement (NACK) (the NACK may be an RLC status report), so as to request the UE for sending information to retransmit the lost data packet.

If the sidelink retransmission manner includes HARQ feedback, that is, if the retransmission manner is HARQ feedback, HARQ retransmission and the combination of ARQ feedback and ARQ retransmission, the t-reordering may be set according to the maximum number of HARQ retransmissions and time required for HARQ retransmission; or, a value of the t-reordering may be set with the frame length information of the numerology or the TTI mapped to the sidelink logic channel or the bearer as a unit.

In an embodiment, the sidelink feedback resource or transmission resource or retransmission resource mentioned in the above example may include at least one of: a resource indication for sending sidelink HARQ feedback, a resource or a resource pool for sidelink communication transmission, a semi-static resource for the sidelink communication transmission, a resource/a resource pool for sidelink communication retransmission, a pairing resource for the sidelink communication transmission/retransmission and for the sidelink HARQ feedback, or a pairing relationship of the resource for the sidelink communication transmission/retransmission and the resource for the sidelink HARQ feedback. The resource indication for sending the sidelink HARQ feedback includes at least one of: a time relationship of sidelink transmission and HARQ feedback, a frame offset, a subframe offset, a resource pattern or a resource bitmap, or a resource index.

Exemplarily, for the step in which the UE acquires the sidelink retransmission configuration information in S201, in the implementation process, this step may include one of following steps.

The UE receives sidelink retransmission configuration information sent by a base station.

The UE acquires sidelink retransmission configuration information through pre-configuration information.

The UE receives sidelink retransmission configuration information sent by a peer UE.

It is to be noted that, for the technical solution in the embodiments of the present disclosure, when the technical solution is set forth based on the LTE or eLTE architecture, the base station may be an eNB; and when the technical solution is set forth based on the 5th Generation mobile communication technology (5G), the base station may be a 5G base station (gNB), which is not repeated in the embodiments of the present disclosure.

In an embodiment, for the step in which the UE acquires the sidelink retransmission configuration information mentioned in the above example, the step may include one of following steps: the UE receives sidelink retransmission configuration information sent by the base station from a system broadcast message, or the UE receives sidelink retransmission configuration information from radio resource control (RRC) dedicated signaling.

In an embodiment, for the step in which the UE acquires sidelink retransmission configuration information through pre-configuration information mentioned in the above example, the step may include a following step: the UE acquires the pre-configuration information including the sidelink retransmission configuration information from a proximity based services function (ProSe Function) or from a V2X control function.

In an embodiment, for the step in which the UE receives sidelink retransmission configuration information sent by a peer UE mentioned in the above example, the step may include following steps: the UE receives PC5 signaling sent by the peer UE and carrying the sidelink retransmission configuration information, and/or the UE receives sidelink control information (SCI) sent by the peer UE and carrying the sidelink feedback resource.

It is to be noted that, for S201, the sidelink retransmission configuration information may be cell-level sidelink retransmission configuration information, or bearer-level sidelink retransmission configuration information.

Exemplarily, before S201, the method in the embodiment may further include a following step. The UE sends sidelink retransmission configuration information to a base station.

It is to be noted that, for the LTE architecture, the base station may be an eNB, and for the 5G technology, the base station may be a gNB.

In an embodiment, the sidelink retransmission indication information includes at least one of: a service/bearer reliability requirement/level, a service/bearer packet loss rate requirement, a service type, a priority, a delay requirement, a sidelink retransmission requirement indication, UE-preferred sidelink retransmission configuration, sidelink retransmission configuration supportable by the UE, a sidelink resource request, or a sidelink buffer status report.

In an embodiment, for the implementation process of S201, before or after the UE receives the sidelink retransmission configuration information sent by the base station, the method may further include a following step.

The UE receives sidelink transmission power and/or a sidelink MCS configured by the base station. Transmit power and/or an MCS of the UE are configured by the base station by monitoring sending and feedback on the sidelink and according to a frequency of NACKs fed back from the received UE.

Exemplarily, in combination with the description of S201, the step of S202 may include two aspects: the UE perform the sidelink feedback according to the sidelink retransmission configuration information, and the UE performs the sidelink retransmission according to the sidelink retransmission configuration information. The implementation process of the two aspects is described below.

For the first aspect, the step in which the UE performs sidelink feedback according to the sidelink retransmission configuration information may include at least one of following steps.

If the UE is configured as the sidelink HARQ feedback, the UE perform the sidelink HARQ feedback by using a received resource for the sending sidelink HARQ feedback.

If the UE is configured as the sidelink ARQ feedback, the UE performs the sidelink ARQ feedback by using received RLC retransmission configuration information. It will be understood that the form of the sidelink ARQ feedback may be a sidelink RLC status report.

For the second aspect, the step in which the UE performs sidelink retransmission according to the sidelink retransmission configuration information may include at least one of following steps.

If the UE selects or is configured as the HARQ continuous retransmission, the UE performs the sidelink retransmission according to the number of HARQ continuous retransmissions.

If the UE selects or is configured as the ARQ continuous retransmission, the UE performs the sidelink retransmission according to the number of ARQ continuous retransmissions.

If the UE selects or is configured as the HARQ feedback and the HARQ retransmission, the UE performs the sidelink retransmission according to one or more of: the maximum number of HARQ retransmissions, sidelink transmission power, an MCS of the sidelink and a redundancy version.

If the UE selects or is configured as the HARQ retransmission and the combination of ARQ feedback and ARQ retransmission, the UE performs the sidelink retransmission according to the number of HARQ continuous retransmissions and the RLC retransmission configuration information.

If the UE selects or is configured as the HARQ feedback, the HARQ retransmission and the combination of ARQ feedback and ARQ retransmission, the UE performs the sidelink retransmission according to one or more of: the maximum number of HARQ retransmissions, the sidelink transmission power, the MCS of the sidelink, the redundancy version and the RLC retransmission configuration information.

The UE performs the sidelink retransmission by using pre-configured sidelink retransmission configuration information.

Exemplarily, before the UE performs sidelink retransmission according to the sidelink retransmission configuration information, the method in the embodiment may further include a following step.

The UE receives sidelink HARQ feedback or sidelink ARQ feedback sent by the peer UE.

It is to be noted that the sidelink ARQ feedback may be the sidelink RLC status report. Exemplarily, before or after the UE performs sidelink retransmission according to the sidelink retransmission configuration information, the method in the embodiment may further include a following step.

The UE adjusts sidelink transmission power and/or an MCS of a sidelink.

In an embodiment, the UE may adjust or modify the sidelink transmission power and/or the MCS of the sidelink according to the frequency of the NACKs fed back from the received UE which is configured to receive information.

Exemplarily, when the sidelink retransmission configuration information is sent by the base station, before or after the UE performs sidelink retransmission according to the sidelink retransmission configuration information, the method in the embodiment may further include a following step.

The UE receives a data packet lost on the sidelink sent by the base station.

It is to be noted that, using the eNB as an example, when the eNB may monitor NACK feedback on the sidelink, the eNB sends the lost data packet to the UE for receiving information through a sidelink resource in a downlink or uplink subframe of a Uu interface.

For the above technical solution, it is to be noted that, for an eV2X scenario with a very high delay requirement, the reception reliability is improved through multiple continuous retransmissions (i.e., HARQ retransmissions) on the MAC layer, and the number of continuous HARQ retransmissions is configurable.

For the sidelink unicast communication, a HARQ ACK/NACK feedback mechanism is introduced at the sidelink MAC layer, and a feedback channel is designed. The UE for receiving information feeds back the ACK or the NACK, and the HARQ retransmission is triggered after the UE for sending information moniors the NACK. Meanwhile, the UE for sending information may adjust the sidelink transmission power and/or the MCS according to the frequency of the NACKs fed back from the received UE which is configured to receive information.

In addition, for an eV2X sidelink unicast communication scenario with a very high reliability requirement and a relatively relaxed delay requirement, an ARQ feedback and retransmission mechanism of the sidelink RLC layer is introduced and optimized. If the HARQ has no feedback, the data packet sent by the UE for sending information through the sidelink reaches the RLC layer of the UE for receiving information according to the sending time sequence, but under the condition of packet loss, if the RLC layer of the UE for receiving information receives the non-sequentially received data packet, it is considered that the data packet which is not received in sequence is lost, that is, the t-reordering is not needed or the value of the t-reordering is set to be zero, the RLC status feedback report is immediately triggered, and the UE for sending information retransmits the lost data packet after receiving the status feedback report. If the HARQ has feedback and there are multiple parallel HARQ processes, the RLC layer of the UE for receiving information may be out of sequence. Therefore, a t-reordering timer of the RLC layer is set to determine whether data is lost. The timer value may be configured to be different values according to frame lengths of numerology or TTIs mapped to different numerology or radio bearers used by the UE. If the t-reordering is set with the frame length of the used TTI as a unit, the timer expires, and the UE for receiving information triggers the status feedback report and waits for the UE for sending information to perform retransmission.

Through the above description, it is concluded that on the premise of applications or services with different scenarios and different reliability requirements, the information transmission method provided by this embodiment of the present disclosure uses appropriate sidelink retransmission configuration information to ensure the reliability, thereby meeting high reliability requirements of the V2X communication.

Based on the same technical concepts as the preceding embodiments, an embodiment of the present disclosure provides an information transmission method. The method may be applied in a base station in the V2X architecture. It is to be noted that for the technical solution in the embodiments of the present disclosure, when the technical solution is set forth based on the LTE architecture, the base station may be an eNB; and when the technical solution is set forth based on the 5G, the base station may be a gNB, which is not repeated in the embodiments of the present disclosure.

Figure 3:
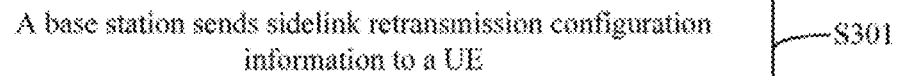
FIG. 3 is a flowchart of another information transmission method according to an embodiment of the present disclosure.

Referring to FIG. 3, the method provided in the embodiment may include a step S301 described below.

In S301, the base station sends sidelink retransmission configuration information to a UE.

It is to be noted that the content of the sidelink retransmission configuration information involved in this step may refer to the description of the sidelink retransmission configuration information in the embodiment one.

Exemplarily, the sidelink retransmission configuration information may include at least one of: a sidelink retransmission manner, sidelink transmission reliability information, MAC retransmission configuration information, RLC retransmission configuration information, a sidelink feedback resource or transmission resource or retransmission resource, or frame length information of numerology and TTI mapped to a sidelink logic channel or a bearer.

In an embodiment, for information included in the sidelink retransmission configuration information mentioned in the above example, it is to be noted that the sidelink retransmission manner may be configured to configure a method for the UE to perform feedback or retransmission, so that the UE performs feedback or retransmission according to the configured method. In an embodiment, the sidelink retransmission manner may include any one of: HARQ continuous retransmission, ARQ continuous retransmission, HARQ feedback and HARQ retransmission, a combination of HARQ retransmission, ARQ feedback and ARQ retransmission, or a combination of HARQ feedback, HARQ retransmission, ARQ feedback and ARQ retransmission.

In an embodiment, the sidelink transmission reliability information mentioned in the above example may be configured to indicate a sidelink transmission reliability level that the sidelink retransmission manner and/or the MAC retransmission configuration information and/or the RLC retransmission configuration information may be provide. In an embodiment, the sidelink transmission reliability information may include at least one of: a quantized sidelink transmission reliability level (e.g., a high reliability level, a medium reliability level, a low reliability level, etc.), or a sidelink transmission packet loss rate.

In an embodiment, the MAC retransmission configuration information mentioned in the above example may include at least one of: the number of HARQ continuous retransmissions, the maximum number of HARQ retransmissions, an HARQ process number, sidelink transmission power, an MCS of the sidelink, or a redundancy version.

In an embodiment, the RLC retransmission configuration information mentioned in the above example may include RLC retransmission configuration information related to a transmission operation and/or RLC retransmission configuration information related to a receiving operation. The RLC retransmission configuration information related to the transmission operation includes the number of ARQ continuous retransmissions or any combination of: the maximum number of ARQ retransmissions, an RLC acknowledged mode (AM) sequence number length, a polling retransmission timer, a polling protocol data unit and the number of poll bytes. The RLC retransmission configuration information related to the receiving operation includes the RLC AM sequence number length, a reordering timer, t-reordering, and a status prohibition timer, t-statusprohibit.

For the reordering timer, t-reordering, it is to be noted that if the sidelink retransmission manner does not include HARQ feedback, that is, if the retransmission manner is HARQ retransmission and the combination of ARQ feedback and ARQ retransmission, the t-reordering may be set to be zero. In an embodiment, when an RLC layer of the UE for receiving information receives a non-sequentially received data packet, that is, if the UE for receiving information finds a data packet lost, the ARQ is immediately triggered to feed back NACK (the NACK may be an RLC status report), so as to request the UE for sending information to retransmit the lost data packet. If the sidelink retransmission manner includes HARQ feedback, that is, if the retransmission manner is HARQ feedback, HARQ retransmission and the combination of ARQ feedback and ARQ retransmission, the t-reordering may be set according to the maximum number of HARQ retransmissions and time required for HARQ retransmission; or, a value of the t-reordering may be set with the frame length information of the numerology or the TTI mapped to the sidelink logic channel or the bearer as a unit.

In an embodiment, the sidelink feedback resource or transmission resource or retransmission resource mentioned in the above example may include at least one of: a resource indication for sending sidelink HARQ feedback, a resource or a resource pool for sidelink communication transmission, a semi-static resource for the sidelink communication transmission, a resource/a resource pool for sidelink communication retransmission, a pairing resource for the sidelink communication transmission/retransmission and for the sidelink HARQ feedback, or a pairing relationship of the resource for the sidelink communication transmission/retransmission and the resource for the sidelink HARQ feedback. The resource indication for sending the sidelink HARQ feedback includes at least one of: a time relationship of sidelink transmission and HARQ feedback, a frame offset, a subframe offset, a resource pattern or a resource bitmap, or a resource index.

Exemplarily, before S301, the method in the embodiment may further include a following step. The base station receives sidelink retransmission indication information sent by the UE.

In an embodiment, the sidelink retransmission indication information includes at least one of: a service/bearer reliability requirement/level, a service/bearer packet loss rate requirement, a service type, a priority, a delay requirement, a sidelink retransmission requirement indication, UE-preferred sidelink retransmission configuration, sidelink retransmission configuration supportable by the UE, a sidelink resource request, or a sidelink buffer status report.

Exemplarily, after S301, the method in the embodiment may further include following steps. The base station monitors sending and feedback on the sidelink.

The base station configures or modifies sidelink transmission power and/or an MCS of the sidelink for the UE for sending information, or the base station sends a data packet lost on the sidelink to the UE for receiving information.

In an embodiment, using the eNB as an example, if the eNB monitors NACK feedback, the eNB sends the lost data packet to the UE for receiving information through a sidelink resource in a downlink or uplink subframe of a Uu interface.

In the information transmission method provided by this embodiment of the present disclosure, on the premise of applications or services with different scenarios and different reliability requirements, the base station sends appropriate sidelink retransmission configuration information to the UE, so as to enable the UE to use the appropriate sidelink retransmission configuration information to ensure the reliability, thereby meeting high reliability requirements of the V2X communication.

Figure 4:
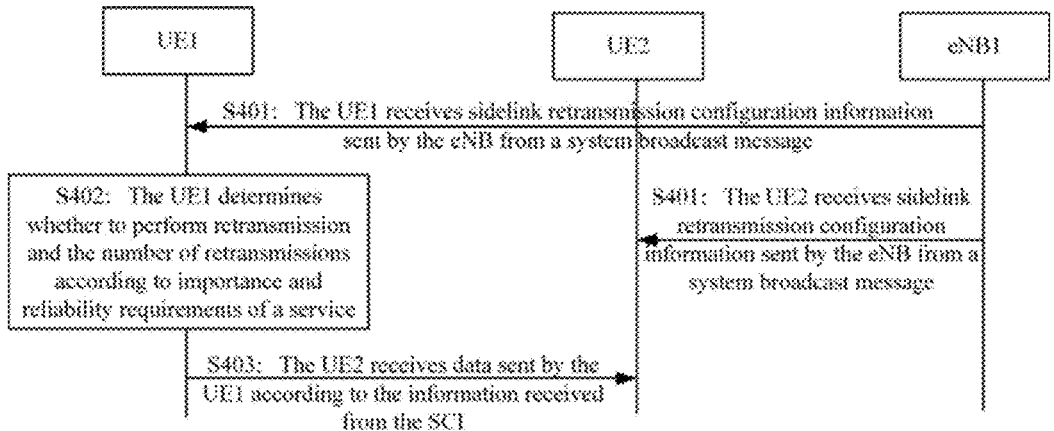
FIG. 4 is a flowchart one of an information transmission method according to an embodiment of the present disclosure.

In a following embodiment, the UE1 for sending information and the UE2 for receiving information are within the coverage of the eNB and perform the V2X communication through a sidelink. As shown in FIG. 4, this embodiment may include steps S401, S402 and S403 described below.

In S401, the UE1 and the UE2 receive sidelink retransmission configuration information sent by the eNB from a system broadcast message.

For example, the eNB may broadcast the number of sidelink HARQ continuous retransmissions to the UE in a cell, or may respectively broadcast the maximum number of sidelink HARQ continuous retransmissions and/or the number of HARQ transmissions corresponding to different reliability levels to the UE1 and the UE2.

In S402, the UE1 determines whether to perform retransmission and the number of retransmissions according to importance and reliability requirements of a service.

In an embodiment, the UE1 indicates in the SCI whether current data transmission is initial transmission or retransmission, whether to perform retransmission subsequently, the total number of data transmissions, the current number of data transmissions, a data transmission resource and other information.

In S403, the UE2 receives data sent by the UE1 according to the information received from the SCI.

Figure 5:
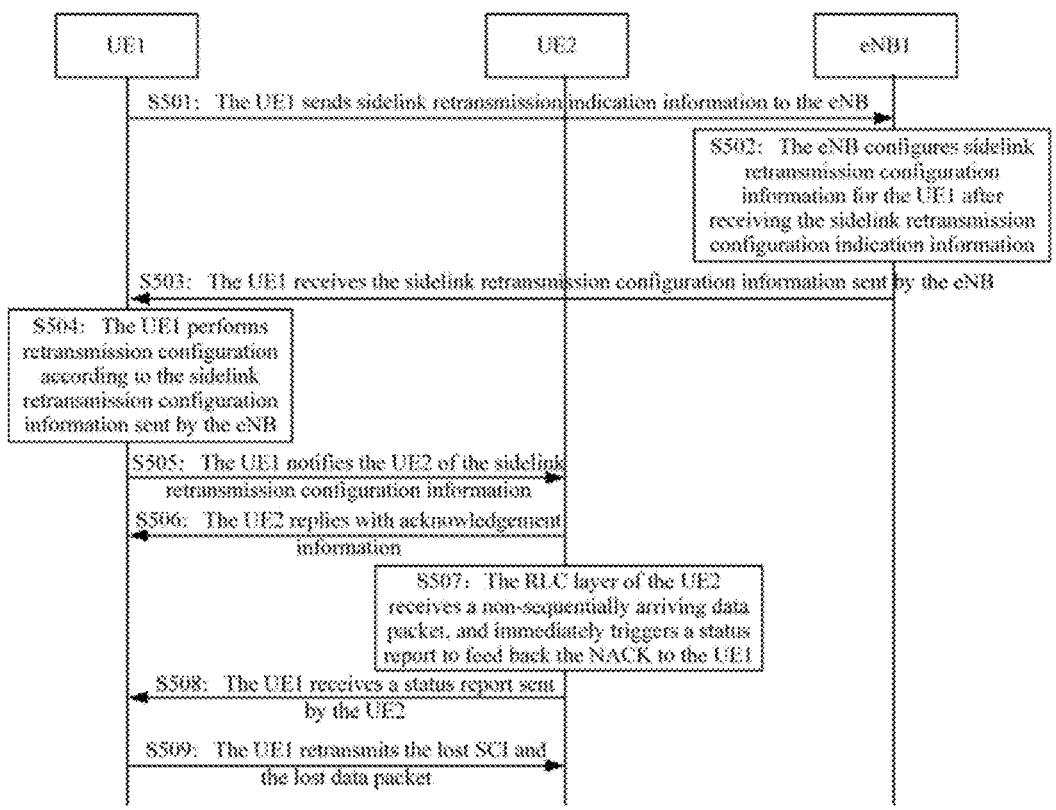
FIG. 5 is a flowchart two of an information transmission method according to an embodiment of the present disclosure.

In a following embodiment, the UE1 for sending information is in an RRC connection state. As shown in FIG. 5, this embodiment may include steps S501 to S509 described below.

In S501, the UE1 sends sidelink retransmission indication information to the eNB.

It is to be noted that the sidelink retransmission indication information is configured to assist the eNB to configure a sidelink retransmission manner and corresponding sidelink retransmission configuration parameters for the UE1. In an embodiment, the sidelink retransmission indication information may include a service reliability requirement or level, a service packet loss rate requirement, a sidelink retransmission requirement indication, a sidelink retransmission manner that the UE expects to acquire, and a sidelink retransmission manner supportable by the UE.

The service reliability requirement or the service reliability level is configured to indicate the reliability requirement of the service to be sent by the UE on the sidelink. The sidelink retransmission request indication indicates whether retransmission is required on the sidelink. The sidelink retransmission manner includes HARQ continuous retransmission, ARQ continuous retransmission, HARQ feedback and HARQ retransmission, a combination of HARQ retransmission, ARQ feedback and ARQ retransmission, and a combination of HARQ feedback, HARQ retransmission, ARQ feedback and ARQ retransmission.

In S502, the eNB configures sidelink retransmission configuration information for the UE1 after receiving the sidelink retransmission configuration indication information.

The sidelink retransmission configuration information may include a sidelink retransmission manner, sidelink transmission reliability level information, MAC retransmission configuration information and RLC retransmission configuration information. The sidelink transmission reliability level information is configured to indicate a sidelink retransmission manner and/or a sidelink transmission reliability level that the sidelink retransmission configuration information may be provide. The MAC retransmission configuration information includes the number of HARQ continuous retransmissions or the maximum number of HARQ retransmissions, and may further include at least one of: an HARQ retransmission resource, or sidelink transmission power and an MCS of the sidelink. The RLC retransmission configuration information includes the number of ARQ continuous retransmissions or any combination of: the maximum number of ARQ retransmissions, an RLC AM sequence number length, a polling retransmission timer, a polling protocol data unit, the number of poll bytes, a reordering timer, t-reordering, or a status prohibition timer, t-statusprohibit.

In this embodiment, the sidelink retransmission manner is HARQ retransmission and the combination of ARQ feedback and ARQ retransmission; the MAC retransmission configuration information includes the number of HARQ continuous retransmission; and the RLC retransmission configuration information includes the maximum number of ARQ retransmissions, an ARQ and other configuration.

In S503, the UE1 receives the sidelink retransmission configuration information sent by the eNB.

In S504, the UE1 performs retransmission configuration according to the sidelink retransmission configuration information sent by the eNB.

In S505, the UE1 notifies the UE2 of the sidelink retransmission configuration information. In an embodiment, the UE1 may notify the UE2 of its retransmission manner and related configuration, and if HARQ feedback or ARQ feedback is involved, the UE2 needs to have corresponding feedback capabilities.

In S506, the UE2 replies with acknowledgement information.

Subsequently, the UE1 requests the eNB for a sidelink transmission resource and performs retransmission according to the sidelink retransmission configuration. The UE1 for sending information will perform HARQ continuous retransmission on the MAC layer, and the SCI will indicate whether the current transmission is initial transmission or retransmission and a location of a data transmission resource. Since no HARQ feedback is involved, the data of the UE1 should arrive in order at the RLC layer of the UE 2, but there is a possibility that packet loss may occur, and therefore, go to S507.

In S507, the RLC layer of the UE2 receives a non-sequentially arriving data packet, and immediately triggers a status report to feed back the NACK to the UE1.

It will be understood that for the non-sequentially arriving data packet, the UE2 may consider that data packets before this data packet are lost. That is, in this case, the reordering timer, i.e., the t-reordering, may be set to be zero or may not need to be configured.

In S508, the UE1 receives a status report (status pdu) sent by the UE2.

In S509, the UE1 retransmits the lost SCI and the lost data packet.

Figure 6:
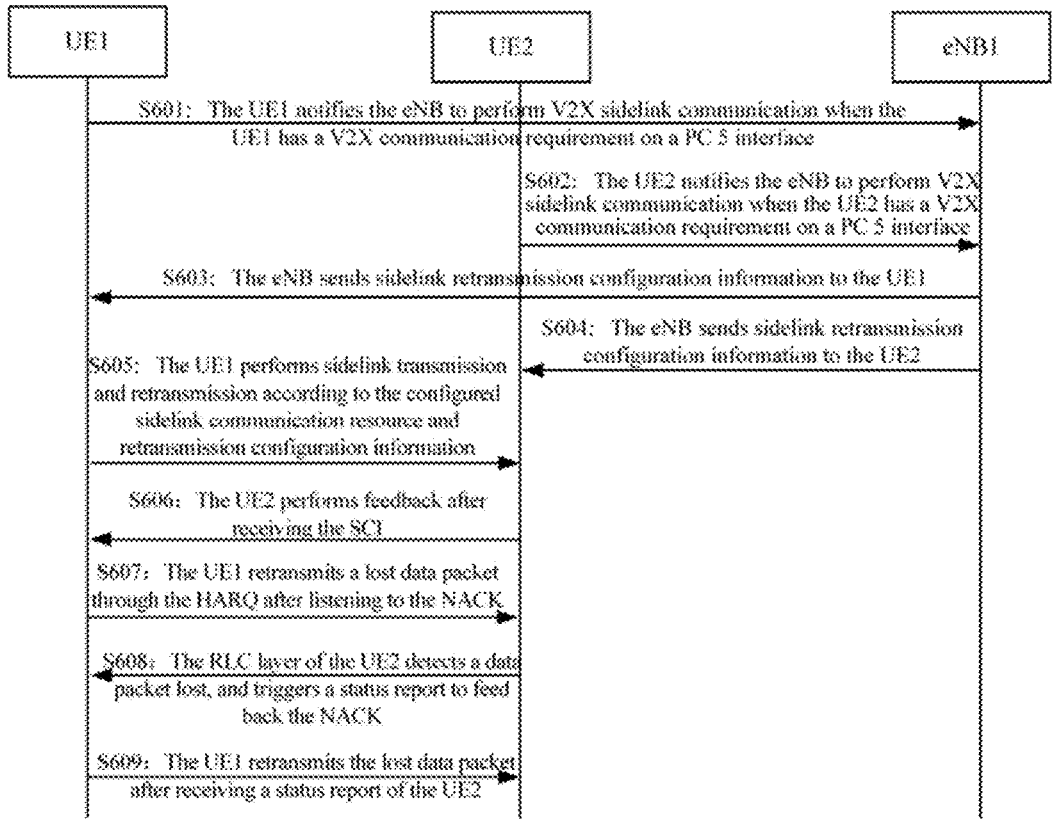
FIG. 6 is a flowchart three of an information transmission method according to an embodiment of the present disclosure.

In a following embodiment, the UE1 for sending information and the UE2 for receiving information are in the RRC connection state. As shown in FIG. 6, this embodiment may include steps S601 to S609 described below.

In S601, the UE1 notifies the eNB to perform V2X sidelink communication when the UE1 has a V2X communication requirement on a PC 5 interface.

In S602, the UE2 notifies the eNB to perform V2X sidelink communication when the UE2 has a V2X communication requirement on a PC 5 interface.

It will be understood that there is no sequence between S601 and S602 in the implementation process, and S601 and S602 are only used to distinguish different steps. In S601 and S602, the notification sent by the UE1 or the UE2 to the eNB may carry related information of the sidelink retransmission indication. It is to be noted that when the eNB knows sending-receiving target pair information and numerology information of the UE1 and the UE2 and configures the sidelink communication resources for the UE1 and the UE2, the eNB configures sidelink retransmission configuration information for the UE1 and the UE2. In an embodiment, the sidelink retransmission configuration information includes one or a combination of: a sidelink retransmission manner, sidelink transmission reliability information, MAC retransmission configuration information, RLC retransmission configuration information, and a sidelink feedback resource or transmission resource or retransmission resource. In this embodiment, the sidelink retransmission manner is set as HARQ feedback, HARQ retransmission and the combination of ARQ feedback and ARQ retransmission. The MAC retransmission configuration information of the UE1 includes at least one of: the maximum number of HARQ retransmissions, sidelink transmission power, an MCS of the sidelink, or an HARQ retransmission resource. The RLC retransmission configuration information includes: the maximum number of ARQ retransmissions, an RLC AM sequence number length, a polling retransmission timer, a polling protocol data unit, the number of poll bytes. The RLC retransmission configuration information of the UE2 includes a reordering timer, t-reordering, and a status prohibition timer, t-statusprohibit. The value of the t-reordering may be configured to set according to the maximum number of HARQ retransmissions and time required for HARQ retransmission, or may be set according to the numerology information of the UE. The sidelink feedback resource or transmission resource or retransmission resource may include at least one of: a resource indication for sending sidelink HARQ feedback, a resource or a resource pool for sidelink communication transmission, a semi-static resource for the sidelink communication transmission, a resource/a resource pool for sidelink communication retransmission, a pairing resource for the sidelink communication transmission/retransmission and for the sidelink HARQ feedback, or a pairing relationship of the resource for the sidelink communication transmission/retransmission and the resource for the sidelink HARQ feedback. The resource indication for sending the sidelink HARQ feedback includes at least one of: a time relationship of sidelink transmission and HARQ feedback, a frame offset, a subframe offset, a resource pattern or a resource bitmap, or a resource index.

In S603, the eNB sends sidelink retransmission configuration information to the UE1.

In S604, the eNB sends sidelink retransmission configuration information to the UE2.

In S605, the UE1 performs sidelink transmission and retransmission according to the configured sidelink communication resource and retransmission configuration information.

In an embodiment, the UE1 includes an initial transmission and retransmission indication, a data transmission resource and an HARQ feedback resource indication in the SCI, where the HARQ feedback resource indication is configured to notify the UE2 of HARQ feedback resource corresponding to the current transmission data by the UE1. The eNB may configures corresponding HARQ feedback resource when configuring a sidelink communication transmission resource for the UE1, that is, the pairing resource for the sidelink communication transmission/retransmission and for the sidelink HARQ feedback; or the UE1 selects the corresponding HARQ feedback resource when selecting the sending resource, and then indicates the corresponding HARQ feedback resource to the UE2 through the SCI.

In S606, the UE2 performs feedback after receiving the SCI.

In an embodiment, the UE2 may feed back whether to receive corresponding data by using the HARQ feedback resource indicated by the UE1; or acquire a sidelink HARQ feedback resource corresponding to the currently received data of the UE1 according to the sidelink communication transmission/retransmission resource and the pairing relationship of resources for sidelink HARQ feedback. The UE2 may also feedback the ACK/NACK by using a specially designed sidelink feedback channel.

After the UE2 feeds back the NACK, the technical solution of this embodiment performs S607: the UE1 retransmits a lost data packet through the HARQ after monitoring the NACK.

Since HARQ feedback is involved, assuming that there are multiple parallel HARQ processes, data packets received by the UE2 may be out of order.

In S608, the RLC layer of the UE2 detects a data packet lost, and triggers a status report to feed back the NACK.

When the t-reordering expires, it is determined that the corresponding data packet is lost.

Figure 7:
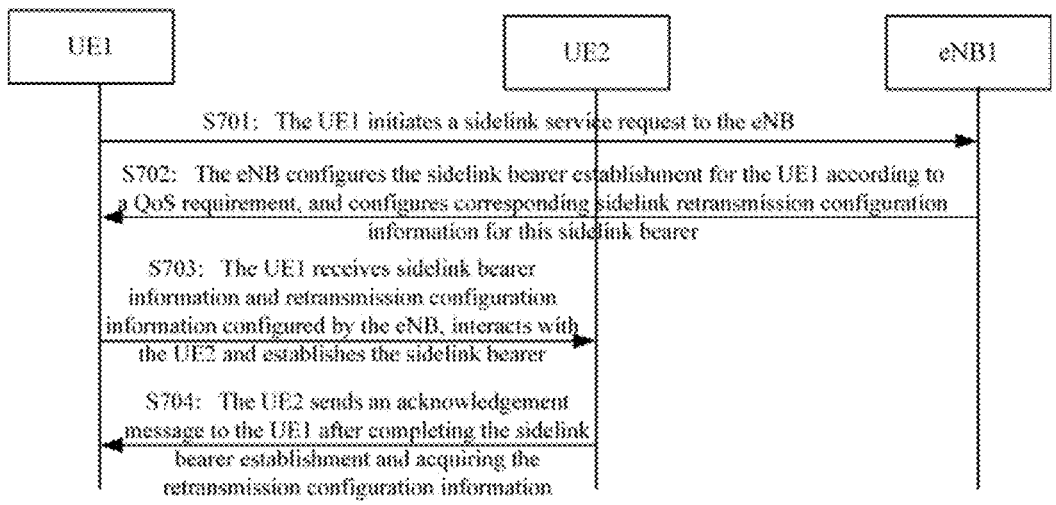
FIG. 7 is a flowchart four of an information transmission method according to an embodiment of the present disclosure.

In S609, the UE1 retransmits the lost data packet after receiving a status report of the UE2. In a following embodiment, the UE1 is for sending information and the UE2 is for receiving information. As shown in FIG. 7, the technical solution of this embodiment may include steps S701 to S704 described below.

In S701, the UE1 initiates a sidelink service request to the eNB.

It will be understood that, when the UE1 has a V2X communication requirement through the PC5 interface, the UE1 will initiate a sidelink service request to the eNB, where the request may include a sidelink V2X service characteristic or a quality of service (QoS) requirement (the QoS requirement may include a reliability requirement/a packet loss rate requirement, a retransmission indication, etc.). This request may be configured to request to configure a sidelink bearer establishment.

In S702, the eNB configures the sidelink bearer establishment for the UE1 according to the QoS requirement, and configures corresponding sidelink retransmission configuration information for this sidelink bearer.

In an embodiment, the eNB may configure the sidelink retransmission configuration information according to the packet loss rate requirement/the reliability requirement and the sidelink retransmission indication information.

In S703, the UE1 receives sidelink bearer information and retransmission configuration information configured by the eNB, interacts with the UE2 and establishes the sidelink bearer.

In S704, the UE2 sends an acknowledgement message to the UE1 after completing the sidelink bearer establishment and acquiring the retransmission configuration information.

It will be understood that the sidelink bearer establishment is completed and the retransmission configuration information corresponding to bearers are interacted between the UE1 and the UE2. The UE1 and the UE2 request the eNB for sidelink communication resources, and perform sidelink transmission, possible feedback and required retransmission according to the configuration.

Figure 8:
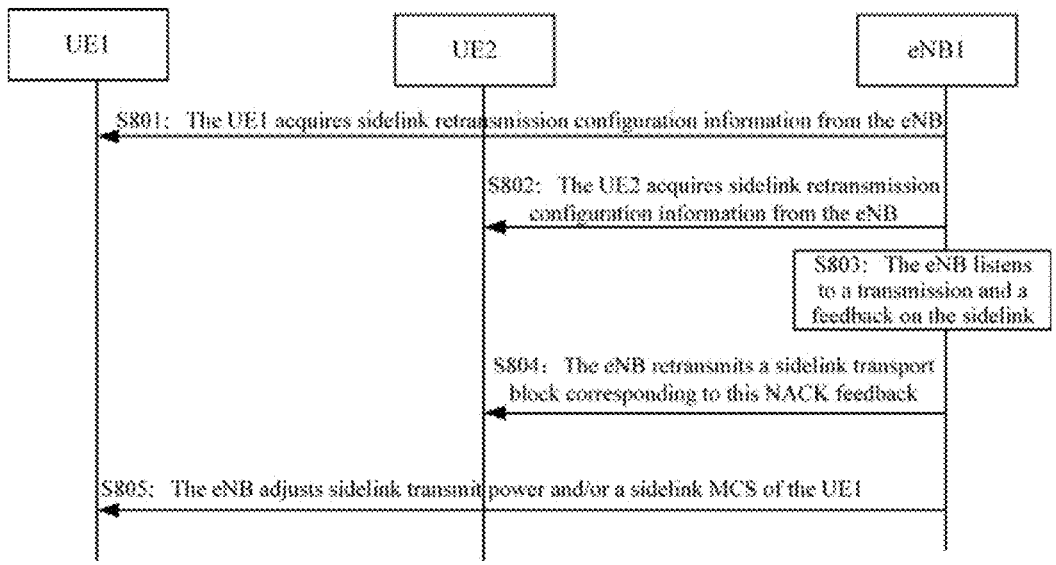
FIG. 8 is a flowchart five of an information transmission method according to an embodiment of the present disclosure.

In a following embodiment, the UE1 is for sending information and the UE2 is for receiving information. In this embodiment, the UE1 and the UE2 acquire sidelink communication resources from the eNB and perform sidelink unicast communication through the PC5 interface. As shown in FIG. 8, the technical solution of this embodiment may include steps S801 to S805 described below.

In S801, the UE1 acquires sidelink retransmission configuration information from the eNB.

In S802, the UE2 acquires sidelink retransmission configuration information from the eNB.

It will be understood that there is no sequence between S801 and S802 in the implementation process, and S801 and S802 are only used to distinguish different steps. In S801 and S802, the retransmission configuration information supports HARQ ACK/NACK feedback.

In an embodiment, the UE2 feeds back the ACK/NACK by using a sidelink feedback channel, and the UE1 triggers HARQ retransmission after monitoring the NACK. Since the resources used by the sidelink are cellular uplink spectrum resources or dedicated spectrum resources allocated by the eNB, the eNB may know the information of the sidelink sending resources and the information of the sidelink receiving resources. Therefore, go to S803.

In S803, the eNB monitors the transmission and the feedback on the sidelink.

It will be understood that if the eNB monitors the NACK feedback on the sidelink, go to step S804: the eNB retransmits a sidelink transport block (TB) corresponding to this NACK feedback; and the eNB may transmits the sidelink TB to the UE2 through a downlink subframe of a Uu interface, and the UE2 is instructed that this data packet is a data packet on the sidelink. At this point, after receiving this data packet, the UE2 transfers the data packet to a sidelink receiving buffer according to the instruction and delivers the data packet to an upper layer. In an embodiment, the eNB sends the data packet lost on the sidelink to the UE2 by using a sidelink resource of an uplink subframe through the Uu interface.

In addition, besides the retransmission to the UE2, the eNB may also set the sidelink sending configuration of the UE1, as in step S805: the eNB adjusts sidelink transmission power and/or a sidelink MCS of the UE1.

Figure 9:
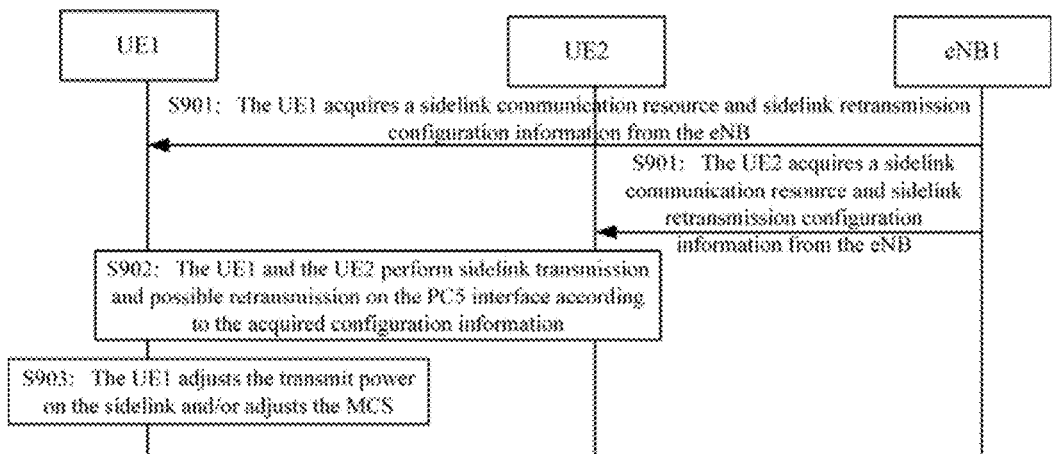
FIG. 9 is a flowchart six of an information transmission method according to an embodiment of the present disclosure.

In a following embodiment, the UE1 is for sending information and the UE2 is for receiving information. As shown in FIG. 9, the technical solution of this embodiment may include steps S901 to S903 described below.

In S901, the UE1 and the UE2 acquire a sidelink communication resource and sidelink retransmission configuration information from the eNB.

For example, the sidelink retransmission manner is HARQ feedback, HARQ retransmission and the combination of ARQ feedback and ARQ retransmission. The MAC retransmission configuration information includes at least one of: the maximum number of HARQ retransmissions, transmit power, an MCS and an HARQ retransmission resource. The RLC retransmission configuration information includes: the maximum number of ARQ retransmissions, an RLC AM sequence number length, a polling retransmission timer, a polling protocol data unit, the number of poll bytes, a reordering timer, t-reordering, or a status prohibition timer, t-statusprohibit.

In S902, the UE1 and the UE2 perform sidelink transmission and possible retransmission on the PC5 interface according to the acquired configuration information.

It is to be noted that since the feedback frequency of the HARQ NACKs or the feedback frequency of the ARQ NACKs may reflect the channel condition, after a certain time of transmission and retransmission, this embodiment further includes step S903: the UE1 adjusts the transmit power on the sidelink and/or adjusts the MCS.

In the actual implementation, the UE1 may adjust the transmit power on the sidelink and/or adjust the MCS according to the received feedback frequency of the HARQ NACKs or the feedback frequency of the ARQ NACKs sent by the UE2.

It will be understood that the UE1 may perform the sidelink transmission according to the adjusted transmit power on the sidelink and/or the adjusted MCS.

The implementation process of the technical solutions of the foregoing embodiments are described in detail through six embodiments, and on the premise of applications or services with different scenarios and different reliability requirements, appropriate sidelink retransmission configuration information is used to ensure the reliability, thereby meeting high reliability requirements of the V2X communication.

Figure 10:
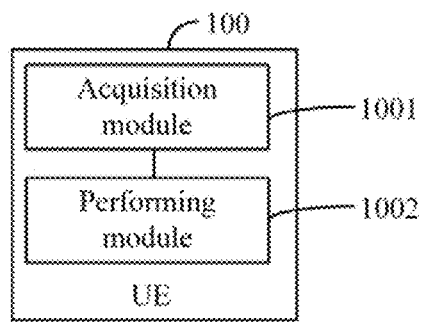
FIG. 10 is a structural diagram of a UE according to an embodiment of the present disclosure.

Based on the same technical concept described in the foregoing embodiments, FIG. 10 shows a UE 100 applied in the V2X architecture provided by an embodiment of the present disclosure. The UE 100 may include: an acquisition module 1001 and a performing module 1002.

The acquisition module 1001 is configured to acquire sidelink retransmission configuration information.

The performing module 1002 is configured to perform sidelink feedback or sidelink retransmission according to the sidelink retransmission configuration information.

Exemplarily, the acquisition module 1001 is configured to receive the sidelink retransmission configuration information sent by a base station.

Alternatively, the acquisition module 1001 is configured to acquire the sidelink retransmission configuration information through pre-configuration information.

Alternatively, the acquisition module 1001 is configured to receive the sidelink retransmission configuration information sent by a peer UE.

It is to be noted that the content of the sidelink retransmission configuration information involved in above description may refer to the description of the sidelink retransmission configuration information in the embodiment one, which is not repeated herein.

In an embodiment, the acquisition module 1001 is configured to receive the sidelink retransmission configuration information sent by the base station from a system broadcast message.

Alternatively, the acquisition module 1001 is configured to receive the sidelink retransmission configuration information from RRC dedicated signaling.

In an embodiment, the acquisition module 1001 is configured to acquire the pre-configuration information including the sidelink retransmission configuration information from a ProSe Function or from a V2X control function.

In an embodiment, the acquisition module 1001 is configured to receive PC5 signaling sent by the peer UE and carrying the sidelink retransmission configuration information; and/or
the acquisition module 1001 is configured to receive sidelink SCI sent by the peer UE and carrying the sidelink feedback resource.

Figure 11:
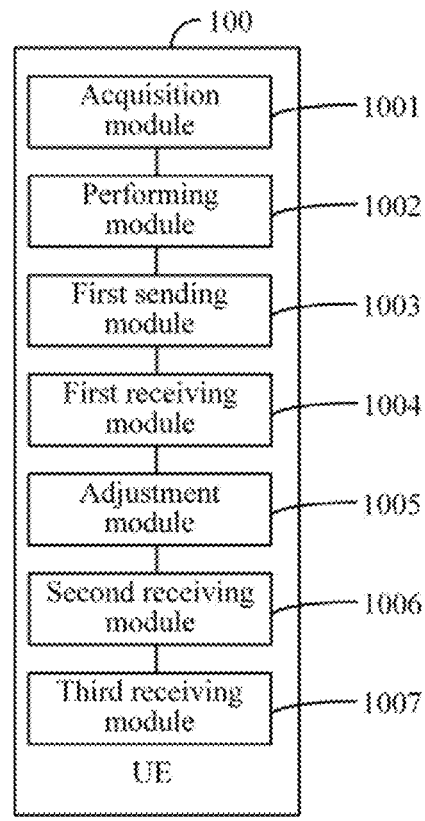
FIG. 11 is a structural diagram of another UE according to an embodiment of the present disclosure.

Exemplarily, referring to FIG. 11, the UE 100 further includes: a first sending module 1003. The first sending module 1003 is configured to send sidelink retransmission indication information to a base station. The sidelink retransmission indication information includes any or any combination of: a service/bearer reliability requirement/level, a service/bearer packet loss rate requirement, a service type, a priority, a delay requirement, a sidelink retransmission requirement indication, UE 100-preferred sidelink retransmission configuration, sidelink retransmission configuration supportable by the UE 100, a sidelink resource request and a sidelink buffer status report.

In an embodiment, referring to FIG. 11, the UE 100 further includes a first receiving module 1004. The first receiving module 1004 is configured to receive sidelink transmission power and/or a sidelink MCS configured by the base station. Transmit power and/or an MCS of the UE 100 are configured by the base station by monitoring the transmission and the feedback on a sidelink and according to a frequency of the NACKs fed back from the received UE.

Exemplarily, the preforming module 1002 is configured to, if the UE is configured as sidelink HARQ feedback, perform the sidelink HARQ feedback by using a received resource for sending the sidelink HARQ feedback.

Alternatively, the preforming module 1002 is configured to, if the UE 100 is configured as sidelink ARQ feedback, perform the sidelink ARQ feedback according to received RLC retransmission configuration information.

Exemplarily, the preforming module 1002 is configured to, if the UE 100 selects or is configured as HARQ continuous retransmission, perform the sidelink retransmission according to the number of HARQ continuous retransmissions.

Alternatively, the preforming module 1002 is configured to, if the UE selects or is configured as ARQ continuous retransmission, perform the sidelink retransmission by the UE 100 according to the number of ARQ continuous retransmissions.

Alternatively, the preforming module 1002 is configured to, if the UE 100 selects or is configured as HARQ feedback and HARQ retransmission, perform the sidelink retransmission according to one or more of: the maximum number of HARQ retransmissions, sidelink transmission power, an MCS of the sidelink and a redundancy version.

Alternatively, the preforming module 1002 is configured to, if the UE selects or is configured as a combination of HARQ retransmission, ARQ feedback and ARQ retransmission, perform the sidelink retransmission according to the number of HARQ continuous retransmissions and RLC retransmission configuration information.

Alternatively, the preforming module 1002 is configured to, if the UE 100 selects or is configured as a combination of HARQ feedback, HARQ retransmission, ARQ feedback and ARQ retransmission, perform the sidelink retransmission according to one or more of: the maximum number of HARQ retransmissions, sidelink transmission power, an MCS of the sidelink, a redundancy version and RLC retransmission configuration information.

Alternatively, the preforming module 1002 is configured to perform the sidelink retransmission by using pre-configured sidelink retransmission configuration information.

Alternatively, the performing module 1002 is configured to perform sidelink retransmission of a respective sidelink logic channel or bearer according to sidelink retransmission configuration information mapped to different sidelink logic channels or bearers.

Exemplarily, referring to 100, the UE 100 further includes an adjustment module 1005. The adjustment module 1005 is configured to adjust sidelink transmission power and/or an MCS of the sidelink.

Exemplarily, referring to 100, the UE 100 further includes a second receiving module 1006. The second receiving module 1006 is configured to receive sidelink HARQ feedback or sidelink ARQ feedback sent by a peer UE.

Exemplarily, referring to 100, the UE 100 further includes a third receiving module 1007. The third receiving module 1007 is configured to receive a data packet lost on the sidelink sent by the base station.

Additionally, various functional modules in the embodiment may be integrated into one processing unit, or each unit may be physically presented separately, or two or more units may be integrated into one unit. The integrated unit may be implemented by hardware or a software functional module.

The integrated unit of the present disclosure may be stored in a computer-readable non-transient storage medium if implemented in the form of a software functional module and sold or used as an independent product. Based on this understanding, the solution provided by the embodiment substantially, or the part contributing to the existing art, or all or part of the technical solution may be embodied in the form of a software product. The computer software product is stored in a storage medium and includes several instructions for enabling a computer device (which may be a personal computer, a server or a network device) or a processor to execute all or part of the steps in the method provided by the embodiment. The foregoing storage medium may be a USB flash disk, a mobile hard disk, a read only memory (ROM), a random access memory (RAM), a magnetic disk, an optical disk or another medium that can store program codes.

The computer program instructions corresponding to an information transmission method in the embodiment may be stored in a storage medium such as an optical disk, a hard disk or a USB flash disk. When the computer program instructions, in the storage medium, corresponding to the information transmission method are read or executed by an electronic device, this process includes following steps.

Sidelink retransmission configuration information is acquired.

Sidelink feedback or sidelink retransmission is performed according to the sidelink retransmission configuration information.

In an embodiment, the step stored in the storage medium in which the UE acquires the sidelink retransmission configuration information may include one of following steps.

The sidelink retransmission configuration information sent by a base station is received.

The sidelink retransmission configuration information is acquired through pre-configuration information.

The sidelink retransmission configuration information sent by a peer UE is received.

In an embodiment, before the step stored in the storage medium in which the sidelink retransmission configuration information is acquire, the method may further include a following step.

Sidelink retransmission configuration information is sent to a base station.

In an embodiment, before or after the step stored in the storage medium in which the sidelink retransmission configuration information sent by the base station is received, the method may further include a following step.

Sidelink transmission power and/or a sidelink MCS configured by the base station are received. Transmit power and/or an MCS of the UE are configured by the base station by monitoring the transmission and feedback on the sidelink and according to an frequency of the NACKs fed back from the received UE.

In an embodiment, the step stored in the storage medium in which the sidelink feedback is performed according to the sidelink retransmission configuration information may include at least one of following steps.

If the UE is configured as the sidelink HARQ feedback, the sidelink HARQ feedback is performed by using a received resource for the sending sidelink HARQ feedback.

If the UE is configured as the sidelink ARQ feedback, the sidelink ARQ feedback is performed by using received RLC retransmission configuration information. It will be understood that the form of the sidelink ARQ feedback may be a sidelink RLC status report.

In an embodiment, the step stored in the storage medium in which the sidelink retransmission is performed according to the sidelink retransmission configuration information may include at least one of following steps.

If the UE selects or is configured as the HARQ continuous retransmission, the sidelink retransmission is performed according to the number of HARQ continuous retransmissions.

If the UE selects or is configured as the ARQ continuous retransmission, the sidelink retransmission is performed according to the number of ARQ continuous retransmissions.

If the UE selects or is configured as the HARQ feedback and the HARQ retransmission, the sidelink retransmission is performed according to one or more of: the maximum number of HARQ retransmissions, sidelink transmission power, an MCS of the sidelink and a redundancy version.

If the UE selects or is configured as the HARQ retransmission and the combination of ARQ feedback and ARQ retransmission, the sidelink retransmission is performed according to the number of HARQ continuous retransmissions and RLC retransmission configuration information.

If the UE selects or is configured as the HARQ feedback, the HARQ retransmission and the combination of ARQ feedback and ARQ retransmission, the sidelink retransmission is performed according to one or more of: the maximum number of HARQ retransmissions, sidelink transmission power, an MCS of the sidelink, a redundancy version and RLC retransmission configuration information.

The sidelink retransmission is performed by using pre-configured sidelink retransmission configuration information.

The sidelink retransmission of a respective sidelink logic channel or bearer is performed according to sidelink retransmission configuration information mapped to different sidelink logic channels or bearers.

In an embodiment, before the step stored in the storage medium in which the sidelink retransmission is performed according to the sidelink retransmission configuration information, the method may further include a following step.

Sidelink HARQ feedback or sidelink ARQ feedback sent by the peer UE is received.

In an embodiment, before or after the step stored in the storage medium in which the sidelink retransmission is performed according to the sidelink retransmission configuration information, the method may further include a following step.

Sidelink transmission power and/or an MCS of the sidelink are adjusted.

In an embodiment, before or after the step stored in the storage medium in which the sidelink retransmission is performed according to the sidelink retransmission configuration information, the method may further include a following step.

A data packet lost on the sidelink sent by the base station is received.

On the premise of applications or services with different scenarios and different reliability requirements, the UE 100 provided by this embodiment of the present disclosure uses appropriate sidelink retransmission configuration information to ensure the reliability, thereby meeting high reliability requirements of the V2X communication.

Figure 12:
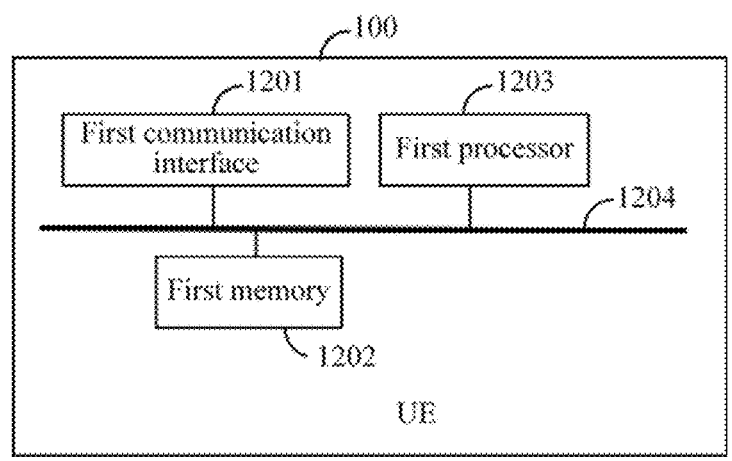
FIG. 12 is a schematic diagram of a hardware structure of a UE according to an embodiment of the present disclosure.

Based on the same technical concept described in the foregoing embodiments, FIG. 12 shows a hardware structure of the UE 100 provided by an embodiment of the present disclosure. The UE 100 may include a first communication interface 1201, a first memory 1202, a first processor 1203 and a first bus 1204.

The first bus 1204 is configured to connect the first communication interface 1201, the first processor 1203 and the first memory 1202 for communication among these components.

The first communication interface 1201 is configured to perform data transmission with an external network element.

The first memory 1202 is configured to store instructions and data.

The first processor 1203 is configured to execute the instructions to implement: acquiring sidelink retransmission configuration information; and performing sidelink feedback or sidelink retransmission according to the sidelink retransmission configuration information.

In the practical application, the first memory 1202 may be a volatile memory such as a random-access memory (RAM), a non-volatile memory such as a read-only memory (ROM), a flash memory, a hard disk drive (HDD) or a solid state drive (SSD), or a combination thereof, and the second memory 1202 provides the instructions and the data for the first processor 1203. The first processor 1203 may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It will be understood that for different devices, the electronic component for implementing the functions of the first processor may be other devices, which is not limited in the embodiments of the present disclosure.

Exemplarily, the first processor 1203 may be configured to perform one of following steps.

The sidelink retransmission configuration information sent by a base station is received.

The sidelink retransmission configuration information is acquired through pre-configuration information.

The sidelink retransmission configuration information sent by a peer UE is received.

Exemplarily, the first processor 1203 is further configured to send sidelink retransmission indication information to a base station.

Exemplarily, the first processor 1203 is further configured to receive sidelink transmission power and/or a sidelink MCS configured by the base station. The transmit power and/or an MCS of the UE are configured by the base station by monitoring the transmission and feedback on a sidelink and according to an frequency of the NACKs fed back from the received UE. Exemplarily, the first processor 1203 may be configured to perform one of following steps.

If the UE is configured as the sidelink HARQ feedback, the sidelink HARQ feedback is performed by using a received resource for the sending sidelink HARQ feedback.

If the UE is configured as the sidelink ARQ feedback, the sidelink ARQ feedback is performed by using received RLC retransmission configuration information. It will be understood that the form of the sidelink ARQ feedback may be a sidelink RLC status report.

Exemplarily, the first processor 1203 may be configured to perform one of following steps.

If the UE selects or is configured as the HARQ continuous retransmission, the sidelink retransmission is performed according to the number of HARQ continuous retransmissions.

If the UE selects or is configured as the ARQ continuous retransmission, the sidelink retransmission is performed according to the number of ARQ continuous retransmissions.

If the UE selects or is configured as the HARQ feedback and the HARQ retransmission, the sidelink retransmission is performed according to one or more of: the maximum number of HARQ retransmissions, sidelink transmission power, an MCS of the sidelink and a redundancy version.

If the UE selects or is configured as the HARQ retransmission and the combination of ARQ feedback and ARQ retransmission, the sidelink retransmission is performed according to the number of HARQ continuous retransmissions and RLC retransmission configuration information.

If the UE selects or is configured as the HARQ feedback, the HARQ retransmission and the combination of ARQ feedback and ARQ retransmission, the sidelink retransmission is performed according to one or more of: the maximum number of HARQ retransmissions, sidelink transmission power, an MCS of the sidelink, a redundancy version and RLC retransmission configuration information.

The sidelink retransmission is performed by using preconfigured sidelink retransmission configuration information.

The sidelink retransmission of a respective sidelink logic channel or bearer is performed according to sidelink retransmission configuration information mapped to different sidelink logic channels or bearers.

Exemplarily, the first processor 1203 further is further configured to receive sidelink HARQ feedback or sidelink ARQ feedback sent by a peer UE.

Exemplarily, the first processor 1203 is further configured to adjust sidelink transmission power and/or an MCS of the sidelink.

Exemplarily, the first processor 1203 further is further configured to receive a data packet lost on the sidelink sent by the base station.

Figure 13:
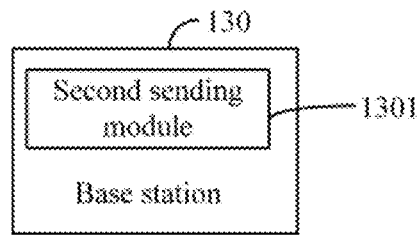
FIG. 13 is a structural diagram of a base station according to an embodiment of the present disclosure.

Based on the same technical concepts described in the foregoing embodiments, FIG. 13 shows a base station 130 provided by an embodiment of the present disclosure. The terminal 130 includes a second sending module 1301. The second sending module 1301 is configured to send sidelink retransmission configuration information to a UE.

Exemplarily, referring to 14, the base station 130 further includes a fourth receiving module 1302. The fourth receiving module 1302 is configured to receive sidelink retransmission indication information sent by the UE.

The sidelink retransmission indication information includes at least one of: a service/bearer reliability requirement/level, a service/bearer packet loss rate requirement, a service type, a priority, a delay requirement, a sidelink retransmission requirement indication, UE-preferred sidelink retransmission configuration, sidelink retransmission configuration supportable by the UE, a sidelink resource request, or a sidelink buffer status report.

Figure 14:
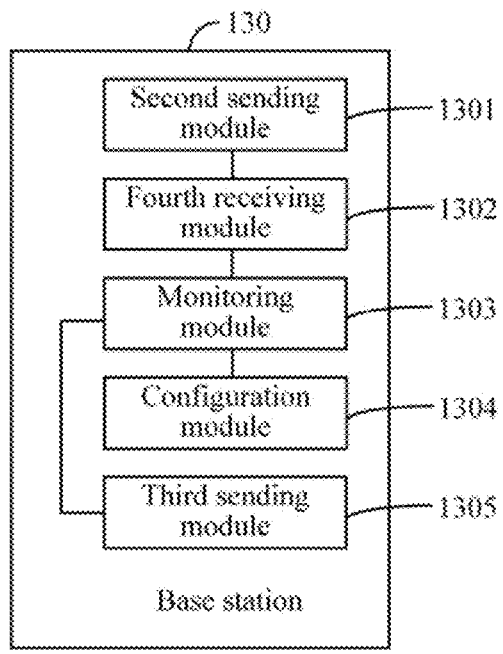
FIG. 14 is a structural diagram of another base station according to an embodiment of the present disclosure.

Exemplarily, referring to FIG. 14, the base station 130 may further include a monitoring module 1303, a configuration module 1304 and a third sending module 1305. The monitoring module 1303 is configured to monitor a transmission and a feedback on a sidelink, and trigger the configuration module 1304 or the third sending module 1305.

The configuration module 1304 is configured to adjust or modify sidelink transmission power and/or an MCS of the sidelink by a UE for sending information.

The third sending module 1305 is configured to send a data packet lost on the sidelink to a UE for receiving information.

In an embodiment, the monitoring module 1303 is configured to monitor the transmission and feedback on the sidelink, and when NACK feedback is monitored, trigger the configuration module 1305.

The third sending module 1305 is configured to send the lost data packet to the UE for receiving information through a sidelink resource in a downlink or uplink subframe of a Uu interface. Additionally, various functional modules in the embodiment may be integrated into one processing unit, or each unit may be physically presented separately, or two or more units may be integrated into one unit. The integrated unit may be implemented by hardware or a software functional module.

The integrated unit of the present disclosure may be stored in a computer-readable storage medium if implemented in the form of a software functional module and sold or used as an independent product. Based on this understanding, the solution provided by the embodiment substantially, or the part contributing to the existing art, or all or part of the technical solution may be embodied in the form of a software product. The computer software product is stored in a storage medium and includes several instructions for enabling a computer device (which may be a personal computer, a server or a network device) or a processor to execute all or part of the steps in the method provided by the embodiment. The foregoing storage medium may be a USB flash disk, a mobile hard disk, a read only memory (ROM), a random access memory (RAM), a magnetic disk, an optical disk or another medium that can store program codes.

The computer program instructions corresponding to an information transmission method in the embodiment may be stored in a storage medium such as an optical disk, a hard disk or a USB flash disk. When the computer program instructions, in the storage medium, corresponding to the information transmission method are read or executed by an electronic device, this process includes following steps.

Sidelink retransmission configuration information is sent to a UE.

It is to be noted that the content of the sidelink retransmission configuration information involved in this step may refer to the description of the sidelink retransmission configuration information in the embodiment one.

In an embodiment, before the step stored in the storage medium in which the sidelink retransmission configuration information is sent to the UE, the method may further include a following step.

Sidelink retransmission indication information sent by the UE is received.

In an embodiment, the sidelink retransmission indication information includes at least one of: a service/bearer reliability requirement/level, a service/bearer packet loss rate requirement, a service type, a priority, a delay requirement, a sidelink retransmission requirement indication, UE-preferred sidelink retransmission configuration, sidelink retransmission configuration supportable by the UE, a sidelink resource request, or a sidelink buffer status report.

In an embodiment, after the step stored in the storage medium in which the sidelink retransmission configuration information is sent to the UE, the method may further include following steps.

A transmission and a feedback on the sidelink are monitored.

Sidelink transmission power and/or an MCS of the sidelink are configured or modified for the UE for sending information, or a data packet lost on the sidelink is sent to the UE for receiving information.

In an embodiment, the step stored in the storage medium in which the base station sends the data packet lost on the sidelink to the UE for receiving information includes following steps.

A transmission and a feedback on the sidelink are monitored.

When NACK feedback is monitored, the lost data packet is sent to the UE for receiving information through a sidelink resource in a downlink or uplink subframe of a Uu interface.

Figure 15:
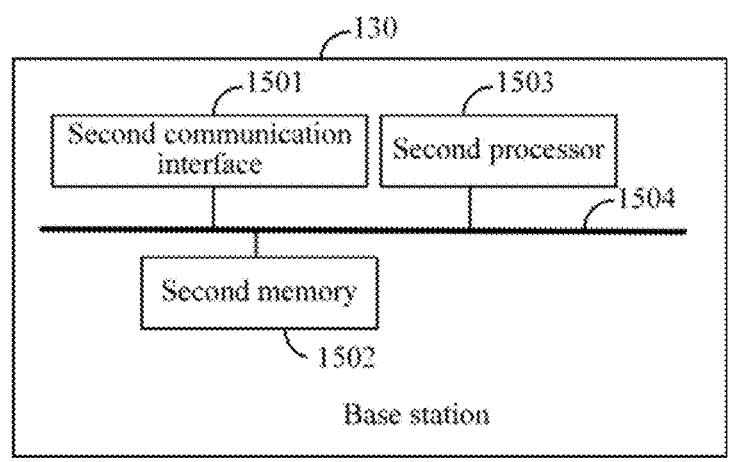
FIG. 15 is a schematic diagram of a hardware structure of a base station according to an embodiment of the present disclosure.

In the base station 130 provided by this embodiment of the present disclosure, on the premise of applications or services with different scenarios and different reliability requirements, the base station 130 sends appropriate sidelink retransmission configuration information to the UE, so as to enable the UE to use the appropriate sidelink retransmission configuration information to ensure the reliability, thereby meeting high reliability requirements of the V2X communication. Based on the same technical concept described in the foregoing embodiments, FIG. 15 shows a hardware structure of the base station 130 provided by an embodiment of the present disclosure. The base station 130 may include a second communication interface 1501, a second memory 1502, a second processor 1503 and a second bus 1504.

The second bus 1504 is configured to connect the second communication interface 1501, the second processor 1503 and the second memory 1502 for communication among these components.

The second communication interface 1501 is configured to perform data transmission with an external network element.

The second memory 1502 is configured to store instructions and data.

The second processor 1503 is configured to execute the instructions to implement: sending sidelink retransmission configuration information to a UE.

In the practical application, the second memory 1502 may be a volatile memory such as a random-access memory (RAM), a non-volatile memory such as a read-only memory (ROM), a flash memory, a hard disk drive (HDD) or a solid state drive (SSD), or a combination thereof, and the second memory 1502 provides the instructions and the data for the second processor 1503.

The second processor 1503 may be at least one of: an application specific integrated circuit (ASIC), a digital signal processor (DSP), a digital signal processing device (DSPD), a programmable logic device (PLD), a field programmable gate array (FPGA), a central processing unit (CPU), a controller, a microcontroller or a microprocessor. It will be understood that for different devices, the electronic component for implementing the functions of the second processor may be other devices, which is not limited in the embodiments of the present disclosure.

Exemplarily, the second processor 1503 is further configured to receive sidelink retransmission indication information sent by the UE.

In an embodiment, the sidelink retransmission indication information includes any one or a combination of: a service/bearer reliability requirement/level, a service/bearer packet loss rate requirement, a service type, a priority, a delay requirement, a sidelink retransmission requirement indication, UE-preferred sidelink retransmission configuration, sidelink retransmission configuration supportable by the UE, a sidelink resource request, or a sidelink buffer status report.

Exemplarily, the second processor 1503 is further configured to monitor a transmission and a feedback on the sidelink, and configure or modify sidelink transmission power and/or an MCS of the sidelink for the UE for sending information, or send a data packet lost on the sidelink to the UE for receiving information.

In an embodiment, the second processor 1503 is further configured to, if the NACK feedback is monitored, send the lost data packet to the UE for receiving information through a sidelink resource in a downlink or uplink subframe of a Uu interface.

Figure 16:
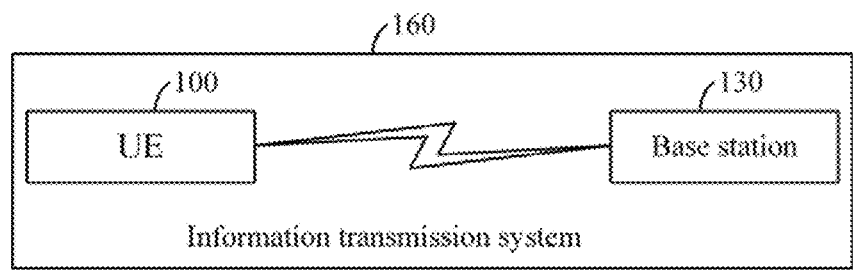
FIG. 16 is a structural diagram of an information transmission system according to an embodiment of the present disclosure.

Based on the same technical concepts described in foregoing embodiments, FIG. 16 shows an information transmission system 160 provided by an embodiment of the present disclosure. The system 160 includes a UE 100 and a base station 130 in the V2X architecture.

The UE 100 is configured to acquire sidelink retransmission configuration information, and perform sidelink feedback or sidelink retransmission according to the sidelink retransmission configuration information.

The base station 130 is configured to send the sidelink retransmission configuration information to the UE 100.

It is to be understood by those skilled in the art that the embodiments of the present disclosure may be provided as methods, systems, or computer program products. Therefore, the present disclosure may adopt a form of a hardware embodiment, a software embodiment, or a combination of hardware and software embodiments. In addition, the present disclosure may adopt a form of a computer program product implemented on one or more computer-usable storage media (including, but not limited to, a disk memory, an optical memory and the like) which include computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processor of another programmable data processing device produce a means for implementing functions specified in one or more flows in the flowcharts and/or one or more blocks in the block diagrams.

These computer program instructions may also be stored in a computer-readable memory which may direct the computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

The above are only preferred embodiments of the present disclosure and are not intended to limit the scope of the present disclosure.

INDUSTRIAL APPLICABILITY

In the embodiments of the present disclosure, a UE in a V2X architecture acquires sidelink retransmission configuration information, and performs sidelink feedback or sidelink retransmission according to the sidelink retransmission configuration information. Therefore, on the premise of applications or services with different scenarios and different reliability requirements, appropriate sidelink retransmission configuration information is used to ensure the reliability, thereby meeting high reliability requirements of the V2X communication.

What is claimed is:

1. An information transmission method, applied to a user equipment (UE) in a vehicle-to-everything (V2X) architecture, comprising:
receiving, by the UE, sidelink retransmission configuration information from a base station through a radio resource control (RRC) dedicated signaling; and
performing, by the UE, a sidelink feedback or a sidelink retransmission according to the sidelink retransmission configuration information; wherein
the sidelink retransmission configuration information comprises: a sidelink retransmission manner, a sidelink logical channel or bearer identity, a sidelink feedback resource, and radio link control (RLC) retransmission configuration information;
the sidelink feedback resource comprises: a resource indication for sending sidelink hybrid automatic repeat request (HARQ) feedback; and
the RLC retransmission configuration information comprises RLC retransmission configuration information related to a transmission operation which comprises: a number of automatic repeat request (ARQ) continuous retransmissions or any combination of: a maximum number of ARQ retransmissions, an RLC acknowledged mode (AM) sequence number length, a polling retransmission timer, and a polling protocol data unit or a number of poll bytes.

2. The method of claim 1, wherein the sidelink retransmission configuration information further comprises at least one of:
sidelink transmission reliability information;
media access control (MAC) retransmission configuration information;
numerology mapped to a sidelink logic channel or a bearer; or
frame length information of a transmission time interval (TTI) mapped to the sidelink logical channel or the bearer.

3. The method of claim 2, wherein the MAC retransmission configuration information comprises at least one of:
a number of the HARQ continuous retransmissions;
a maximum number of HARQ retransmissions;
an HARQ process number;
sidelink transmission power;
a modulation and coding scheme (MCS) of a sidelink; or
a redundancy version.

4. The method of claim 2, wherein the RLC retransmission configuration information further comprises:
RLC retransmission configuration information related to a receiving operation, wherein the RLC retransmission configuration information related to the receiving operation comprises: the RLC AM sequence number length, a reordering timer and a status prohibition timer.

5. The method of claim 1, wherein the sidelink retransmission manner comprises any one of:
the HARQ continuous retransmission;
automatic repeat request (ARQ) continuous retransmission;
HARQ feedback and an HARQ retransmission;
a combination of the HARQ retransmission, ARQ feedback and ARQ retransmission; or
a combination of the HARQ feedback, the HARQ retransmission, the ARQ feedback and the ARQ retransmission.

6. The method of claim 5, wherein
in condition that the sidelink retransmission manner does not comprise HARQ feedback, the reordering timer is set to be zero, or the reordering timer is not configured; and
in condition that the sidelink retransmission manner comprises the HARQ feedback, the reordering timer is set according to a maximum number of HARQ retransmissions and time required by HARQ retransmission, or the reordering timer is set according to at least one of: the numerology mapped to the sidelink logical channel or the sidelink bearer, or the frame length information of the TTI mapped to the sidelink logical channel or the bearer.

7. The method of claim 1, wherein the sidelink feedback resource further comprises at least one of:
a resource/a resource pool for sidelink communication transmission;
a semi-static resource for the sidelink communication transmission;
a resource/a resource pool for sidelink communication retransmission;
a pairing resource for the sidelink communication transmission/retransmission and for the sidelink HARQ feedback; or
a pairing relationship of the resource for the sidelink communication transmission/retransmission and the resource for the sidelink HARQ feedback;
wherein the resource indication for sending the sidelink HARQ feedback comprises at least one of: a time relationship of sidelink transmission and HARQ feedback, a frame offset, a subframe offset, a resource pattern or a resource bitmap, or a resource index.

8. The method of claim 1, wherein before the acquiring, by the UE, the sidelink retransmission configuration information, the method further comprises:
sending, by the UE, sidelink retransmission indication information to a base station;
wherein the sidelink retransmission indication information comprises at least one of: a service/bearer reliability requirement/level, a service/bearer packet loss rate requirement, a service type, a priority, a delay requirement, a sidelink retransmission requirement indication, UE-preferred sidelink retransmission manner, sidelink retransmission manner supportable by the UE, a sidelink resource request, or a sidelink buffer status report.

9. The method of claim 1, wherein the performing, by the UE, the sidelink feedback according to the sidelink retransmission configuration information comprises at least one of:
in response to determining that the UE is configured to perform a sidelink HARQ feedback, performing, by the UE, the sidelink HARQ feedback by using a received resource for sending the sidelink HARQ feedback; or
in response to determining that the UE is configured to perform the sidelink automatic repeat request (ARQ) feedback, performing, by the UE, the sidelink ARQ feedback according to radio link control (RLC) retransmission configuration information related to a receiving operation.

10. The method of claim 1, wherein the performing, by the UE, the sidelink retransmission according to the sidelink retransmission configuration information comprises at least one of:
in response to determining that the UE chooses to or is configured to perform HARQ continuous retransmission, performing, by the UE, the sidelink retransmission according to a number of HARQ continuous retransmissions;
in response to determining that the UE chooses to or is configured to perform automatic repeat request (ARQ) continuous retransmission, performing, by the UE, the sidelink retransmission according to a number of ARQ continuous retransmissions;
in response to determining that the UE chooses to or is configured to perform HARQ feedback and HARQ retransmission, performing, by the UE, the sidelink retransmission according to one or more of: a maximum number of HARQ retransmissions, sidelink transmission power, a modulation and coding scheme (MCS) of the sidelink and the redundancy version;
in response to determining that the UE chooses to or is configured to perform a combination of HARQ retransmission, ARQ feedback and ARQ retransmission, performing, by the UE, the sidelink retransmission according to a number of HARQ continuous retransmissions and radio link control (RLC) retransmission configuration information;
in response to determining that the UE chooses to or is configured to perform a combination of HARQ feedback, HARQ retransmission, ARQ feedback and ARQ retransmission, performing, by the UE, the sidelink retransmission according to one or more of: the maximum number of HARQ retransmissions, the sidelink transmission power, the MCS of the sidelink, the redundancy version and RLC retransmission configuration information; or performing, by the UE, the sidelink retransmission by using pre-configured sidelink retransmission configuration information.

11. The method of claim 1, wherein before or after the performing, by the UE, the sidelink retransmission according to the sidelink retransmission configuration information, the method further comprises:
receiving, by the UE, a data packet lost on a sidelink sent by the base station.

12. A non-transitory storage medium, comprising stored programs, wherein, when executed, the programs execute the information transmission method of claim 1.

13. An information transmission method, applied to a base station in a vehicle-to-everything (V2X) architecture, comprising:
sending, by the base station, sidelink retransmission configuration information to a user equipment (UE) through a radio resource control (RRC) dedicated signaling; wherein
the sidelink retransmission configuration information comprises: a sidelink retransmission manner, a sidelink logical channel or bearer identity, a sidelink feedback resource, and radio link control (RLC) retransmission configuration information;
the sidelink feedback resource comprises: a resource indication for sending sidelink HARQ feedback,
the RLC retransmission configuration information comprises RLC retransmission configuration information related to a transmission operation which comprises: a number of automatic repeat request (ARQ) continuous retransmissions or any combination of: a maximum number of ARQ retransmissions, an RLC acknowledged mode (AM) sequence number length, a polling retransmission timer, and a polling protocol data unit or a number of poll bytes.

14. The method of claim 13, wherein after the sending, by the base station, the sidelink retransmission configuration information to the UE, the method further comprises:
monitoring, by the base station, a transmission and a feedback on a sidelink; and
configuring or modifying at least one of, by the base station, a sidelink transmission power or a modulation and coding scheme (MCS) of the sidelink for a first UE, or sending to a second UE, by the base station, a data packet lost on the sidelink, wherein the first UE is configured to send information and the second UE is configured to receive information.

15. The method of claim 14, wherein the sending, by the base station, the data packet lost on the sidelink to the second UE comprises:
monitoring, by the base station, a transmission and a feedback on the sidelink; and
when monitoring a negative acknowledgement (NACK) feedback, sending, by the base station through a sidelink resource in a downlink or uplink subframe of a Uu interface, the lost data packet to the second UE.

16. A non-transitory storage medium, comprising stored programs, wherein, when executed, the programs execute the information transmission method of claim 13.

17. A user equipment (UE), comprising: a communication interface, a memory, a processor and a bus;
wherein the bus is configured to connect the communication interface, the processor and the memory for communication among the communication interface, the processor and the memory;
the communication interface is configured to perform data transmission with an external network element;

the memory is configured to store instructions and data; and the processor is configured to, when executing the instructions, implement: receiving sidelink retransmission configuration information from a base station through a radio resource control (RRC) dedicated signaling; and performing a sidelink feedback or a sidelink retransmission according to the sidelink retransmission configuration information; wherein the sidelink retransmission configuration information comprises: a sidelink retransmission manner, a sidelink logical channel or bearer identity, a sidelink feedback resource, and radio link control (RLC) retransmission configuration information; the sidelink feedback resource comprises: a resource indication for sending sidelink HARQ feedback; and the RLC retransmission configuration information comprises RLC retransmission configuration information related to a transmission operation which comprises: a number of automatic repeat request (ARQ) continuous retransmissions or any combination of: a maximum number of ARQ retransmissions, an RLC acknowledged mode (AM) sequence number length, a polling retransmission timer, a polling protocol data unit or a number of poll bytes.

\* \* \* \* \*